United States Patent [19]

Booth et al.

[11] Patent Number: 4,986,187

[45] Date of Patent: Jan. 22, 1991

[54] TOY VEHICLE ASSEMBLY WITH VIDEO DISPLAY CAPABILITY

[75] Inventors: Roger Booth, Chester; Thomas D. Heidt, Long Valley, both of N.J.

[73] Assignee: Lionel Trains, Inc., Mt. Clemens, Mich.

[21] Appl. No.: 290,514

[22] Filed: Dec. 27, 1988

[51] Int. Cl.$^5$ ................................................ B60L 9/00
[52] U.S. Cl. .................................... 104/84; 104/297; 105/1.5; 434/63
[58] Field of Search .................. 104/DIG. 1, 53, 295, 104/83, 84, 295, 297; 105/1.5; 246/473 A, 20, 2 R, 3, 7, 10, 11, 122 A; 446/431, 456; 191/22 R, 29 R, 22 C; 358/228, 213.19, 108, 109; 273/86 B; 434/63

[56] References Cited

U.S. PATENT DOCUMENTS

| | | | |
|---|---|---|---|
| 3,689,695 | 9/1972 | Rosenfield et al. | 178/7.81 |
| 4,131,919 | 12/1978 | Lloyd et al. | 358/213.19 |
| 4,214,266 | 7/1980 | Myers | 358/108 |
| 4,277,804 | 7/1981 | Robison | 358/108 |
| 4,399,464 | 8/1983 | Hix et al. | 358/213.19 |
| 4,555,725 | 11/1985 | Geiersbach et al. | 358/93 |
| 4,593,312 | 6/1986 | Yamasaki | 358/213.19 |
| 4,713,685 | 12/1987 | Nishimura et al. | 358/103 |
| 4,734,773 | 3/1988 | Ueda | 358/213.19 |
| 4,734,777 | 3/1988 | Okino et al. | 358/213.19 |
| 4,748,506 | 5/1988 | Hieda | 358/213.19 |
| 4,763,196 | 8/1988 | Sakai | 358/213.19 |
| 4,845,554 | 7/1989 | Kimura et al. | 358/98 |
| 4,845,555 | 7/1989 | Yabe et al. | 358/98 |

OTHER PUBLICATIONS

In the Future Locomotives Can See, Jan.-Feb. 1987, Märklin News Item.

*Primary Examiner*—Robert P. Olszewski
*Assistant Examiner*—Mark T. Le
*Attorney, Agent, or Firm*—Reising, Ethington, Barnard, Perry & Milton

[57] ABSTRACT

The invention comprises a toy vehicle such as a train, for moving about a track and which includes an optical sensing apparatus. The vehicle includes a charge coupled device to sense radiant energy external of the vehicle. The vehicle includes sensing circuitry to convert the image into a video signal. The video signal is FM modulated and supplied to the track by a transmitter on the vehicle for transmission to a receiver. The receiver receives the FM signal and demodulates same to produce a video signal adapted to be received by a monitor for viewing by the user of the toy vehicle as the vehicle moves along the track.

22 Claims, 17 Drawing Sheets

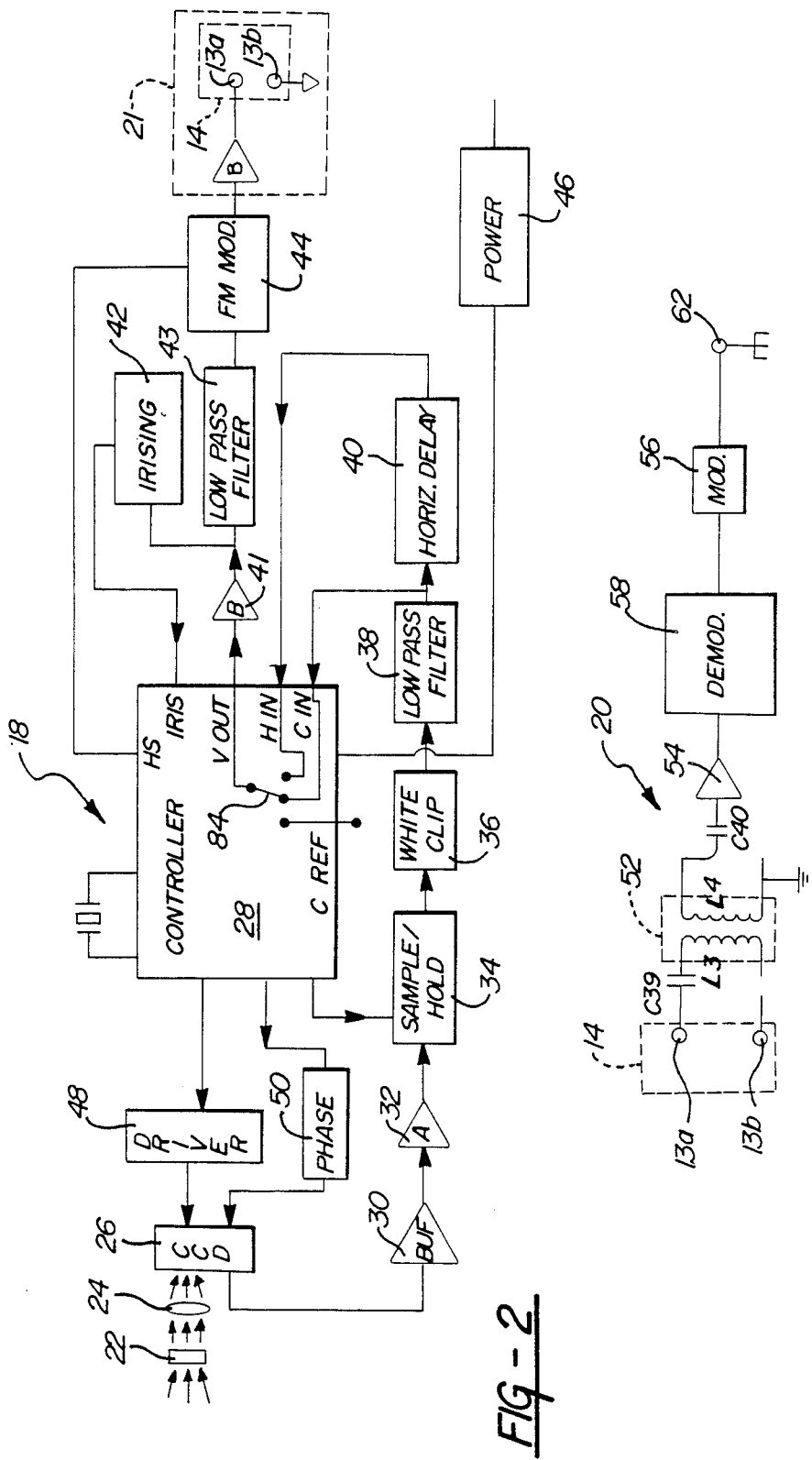

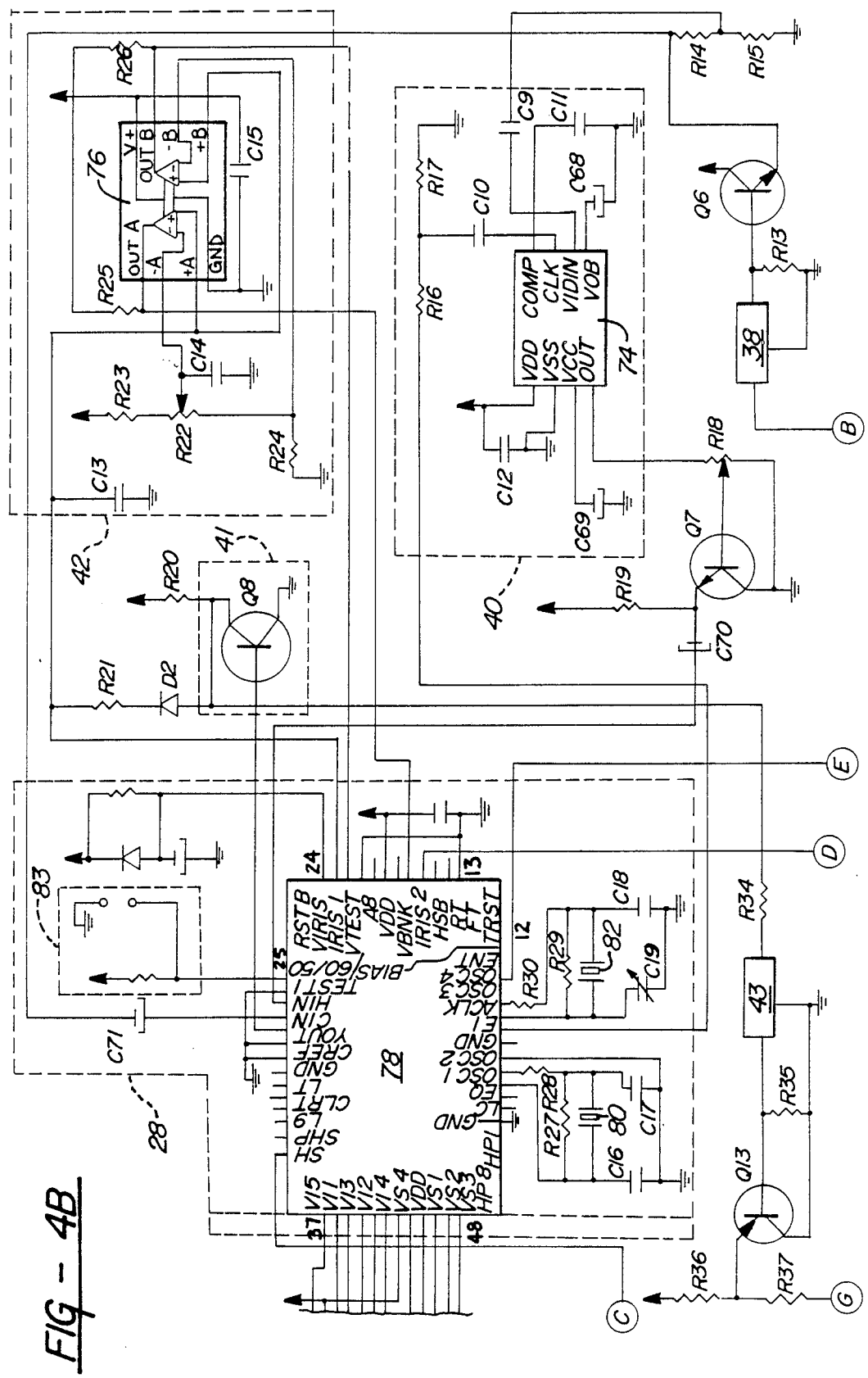

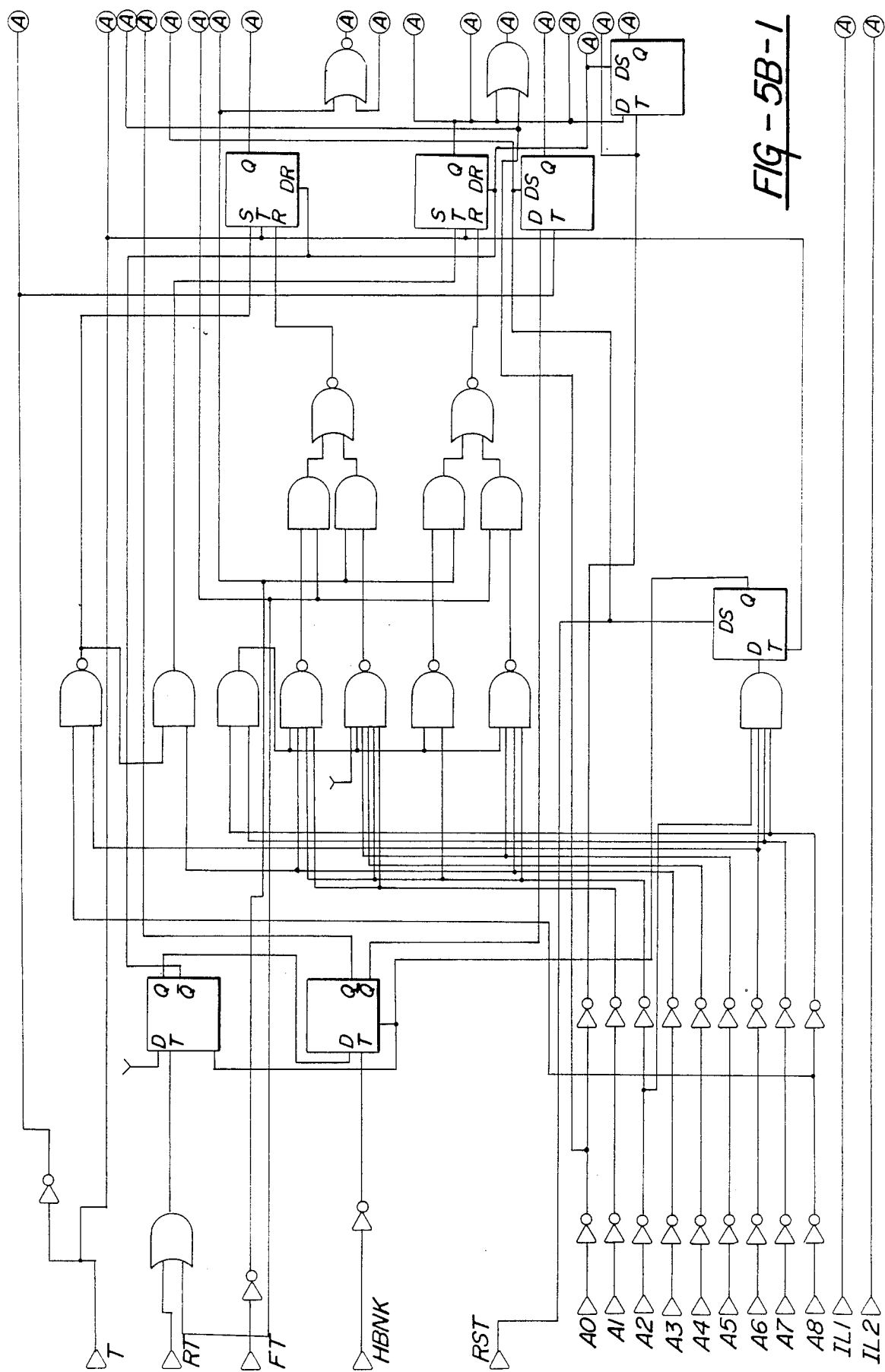

TOY VEHICLE ASSEMBLY WITH VIDEO DISPLAY CAPABILITY

TECHNICAL FIELD

The invention relates to toy vehicles movable on a track and optical sensing apparatus for producing a video signal representative of a sensed image as the vehicle moves on the track.

BACKGROUND OF THE INVENTION

Toy vehicles or trains have been collected by and used for the amusement of persons for many years. Generally, the train is either battery powered or powered from signals transmitted on the rails of the track about which the train moves. Toy trains have been adapted to simulate real trains in many ways such as the generation of sounds including whistles, bells, escaping steam, etc., and of usual effects including lights on the toy train. Many variations are available, and any improvement in uniqueness and the advancement of the trains is desirable.

SUMMARY OF THE INVENTION

The invention contemplates a toy vehicle assembly comprising track means capable of transmitting electrical signals and a toy vehicle having wheels for moving the vehicle along a path defined by the track means. The vehicle includes optical sensing means for sensing an optical image (e.g., formed by radiant energy external of the vehicle) as the vehicle moves along the path and for producing an electrical video signal representative of the sensed image. A transmitter means is provided on the toy vehicle for supplying the electrical video signal to the track means. Also included is receiver means coupled to the track means for receiving an electrical video signal therefrom and producing a video output signal to be received by a monitor to visually reproduce the sensed image as the vehicle moves along the track means for viewing by the user of the toy vehicle assembly.

In one embodiment of the invention, the optical sensing means preferably comprises a charge coupled device having relatively high sensitivity to radiant energy external of the vehicle to sense optical images as the vehicle moves along the track means.

In another embodiment of the invention, the toy vehicle comprises a toy train.

The toy vehicle assembly of the invention provides video display capabilities for viewing by the user in such a manner as to reduce interference problems associated with transmission and display of the video signals and to enhance sensing of radiant energy external of the vehicle under typical conditions of use to provide an improved video display.

The invention also contemplates an optical sensing apparatus for sensing an image formed of radiant energy and producing an electrical video signal representative of the sensed image.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a block diagram of the receiver means;

FIGS. 4A-D is a detailed schematic diagram of the optical sensing means and transmitter means;

DESCRIPTION TO THE PREFERRED EMBODIMENT

Figure 1:
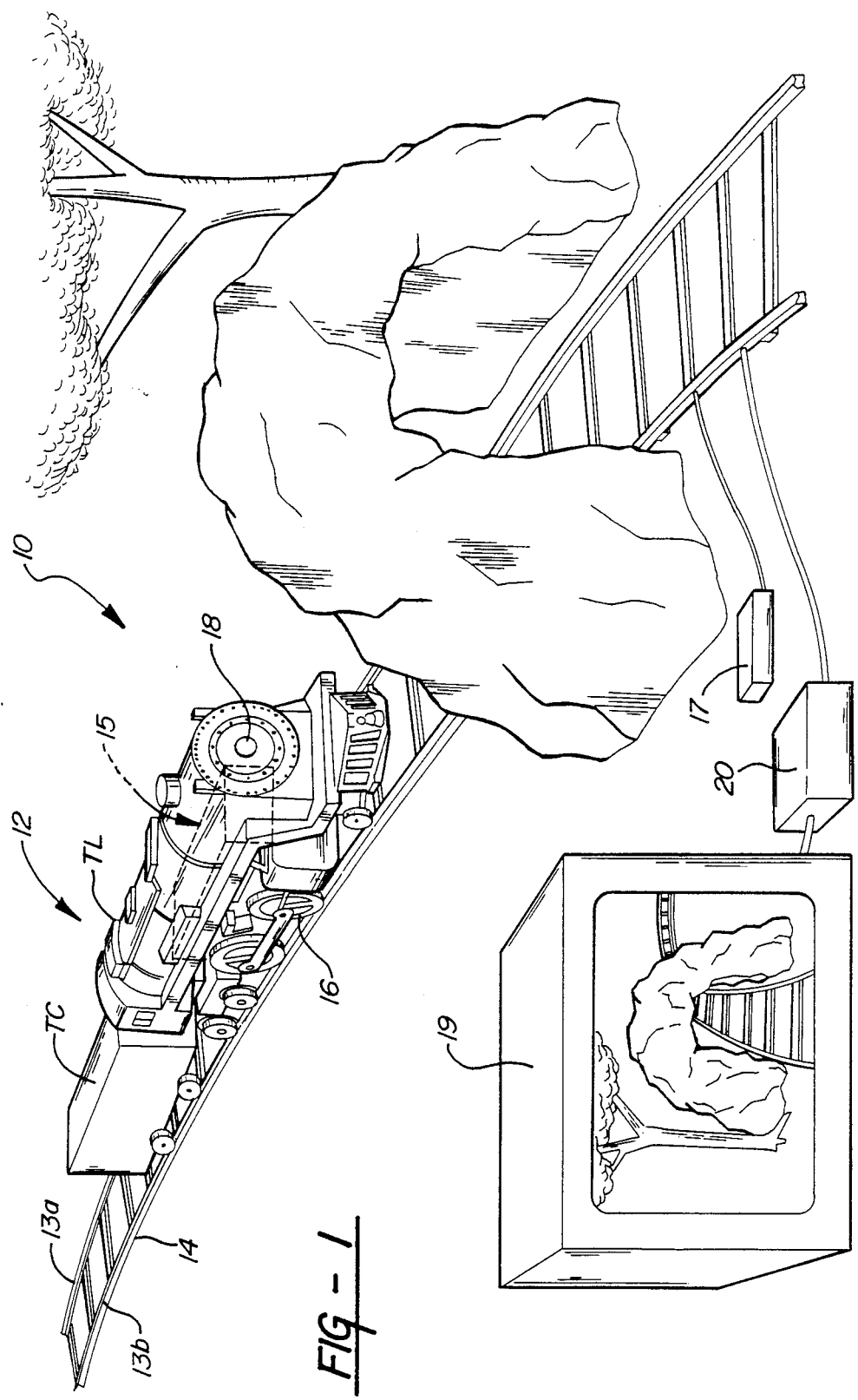
FIG. 1 is a perspective view of the subject invention.

A toy vehicle assembly is generally indicated at 10 in FIG. 1. The assembly 10 includes a vehicle 12, such as the toy train including locomotive TL, tender car TC as well as other cars (not shown) which may be connected thereto, for movement about a track means 14 that forms a desired path of travel for the vehicle 12. The vehicle 12 includes wheel means 16 disposed on the track means 14 for moving the vehicle 12 along the track means 14. The track means 14, as commonly known in the art, includes sections of rails or tracks interconnected to form the desired path of travel for the vehicle 12. The track means 14 includes at least one pair of conductive rails 13a, 13b extending the distance of the track means 14 and capable of transmitting electrical signals. The vehicle 12 includes a conventional electrical motor means 15 (shown schematically in phantom) for rotating and driving the wheels 16 to move the vehicle 12 along the track means 14. For the toy train shown, the electrical motor means is disposed on the locomotive TL.

The toy vehicle assembly 10 also includes motor power supply means 17, such as a conventional transformer, for supplying a low voltage ac or dc power signal to the track means 14. In particular, rail 13a is energized transmitting the electrical video signal while rail 13b is grounded. The motor means 15 receives power from the track means 14. The power is fed from the track means 14 to the motor means 15 through the wheels 16 or through an electrical contact (not shown) engaging the rails 13a, 13b, as is known in the art. Alternatively, the motor power supply means 17 may comprise a battery (not shown) disposed on the train (e.g., on locomotive TL).

The vehicle 12 includes optical sensing means 18 located on the front thereof for sensing image-forming radiant energy external of the vehicle 12 corresponding to an optical image or scene in front of the vehicle 12 as it moves along the track means 14 and for producing an electrical video signal indicative of the sensed image. A transmitter means 21 on the vehicle 12 transmits or sends signals to the track means 14. The transmitter means 21 may include the wheels 16 or contacts for conducting the signal to the rails 13a, 13b. A receiver means 20 is coupled to the track means 14 (e.g., to rail 13a by an electrical connector clip 21) for receiving the electrical signal therefrom and producing a video output signal to be received by a monitor 19 to visually reproduce the sensed image external of the vehicle 12 as it moves along the track. The reproduced visual image is displayed on the television monitor 19 for viewing by the user of the toy vehicle 12 assembly 10 and corresponds to the visual image or scene in front of the vehicle 12 as it moves along the track means 14. Therefore, the assembly 10 is capable of sensing optical images formed by radiant energy produced by or reflected off objects external of the vehicle 12 as it moves along the track means 14 and reproducing that sensed radiant energy in the form of an optical image on the monitor 19 representative of the visual images as viewed from the front of the vehicle 12. Transmission of the signal occurs via the track means 14. The output to the monitor 19 is a typical video output which changes as the visual image is dynamically sensed by the optical sensing means 18 and transmitted by the transmitter means 21 on the vehicle 12 onto the track means 14.

The optical sensing means 18 includes a charged coupled device (CCD) 26 for sensing the radiant energy passed through an infrared filter 22 and a lens 24 and for producing an image of the sensed radiant energy. The filter 22 is provided to decrease the level of infrared energy entering the CCD 26 which is an infrared sensitive device. The lens 24 focuses the entering radiant energy down to the size of the CCD 26. A suitable lens 24 may have a focal length of approximately four (4) inches to infinity.

The charge coupled device 26 is comprised of a series of photo sensitive capacitor storage devices arranged in rows, as generally known in the art, for producing an image in the form of multiple lines. The lines of the image are serially transmitted as a preliminary video signal as will be explained. The photo sensitive capacitors act as a small voltage storage system which is charged up proportionately to the amount of light impinging on them and a period of time between the frame transfers, or more particularly, time between transfers of an individual capacitor. The charged coupled device includes an image array 27 for sensing the radiant energy and a storage array 29 for storing a sensed image in the form of lines of a frame. The image array 27 shifts information to the storage array 29 which produces the preliminary video signal. Therefore, the information of the capacitive field is shifted vertically to the storage array 29 during vertical blanking time. The charge is integrated in the storage array 29 and is serially transferred out using a horizontal frequency or clock line-by-line, as described subsequently. The cells of the image array 27 are cleared by the transfer of the information to the storage array 29. As the vertical blanking is completed, a new frame is being impressed on the image array 27 such that the process is an ongoing or dynamic one.

The optical sensing means 18 also includes control means 28 for controlling the charged coupled device 26 and for producing an output video signal indicative of the image. The control means 28 is the central control for the optical sensing means 18. Generally, the control means 28 controls the clocking of the charge coupled device 26 and receives the preliminary video signal to produce the output video signal in accordance with NTSC (National Television System Committee) video only at 60 Hz standard (or 50 Hz video signal as used in PAL). The preliminary video signal from the charge coupled device 26 is sent to a buffer 30 and then to a level shifter or amplifier means 32 of the optical sensing means 18.

The optical sensing means 18 also includes sample and hold means 34 for receiving the preliminary video signal from the amplifier means 32 and removing the timing signal or reset pulse from the signal to produce a data signal comprising only the optical data or preliminary video. The sample and hold means 34 is a signal level integrator and holding device to store the maximum gain of the output of the video signal from the charge coupled device 26. The sample and hold means 34 is controlled by the control means 28 as will be described in the operation section.

The data signal from the sample and hold means 34 is sent through a white clip 36 to balance white verses black pictures. The white clip 36 removes the peaks which can be sensed and which would wash out the video image. When the spike of the signal is clipped off, the remaining data can be displayed as uniform.

The signal from the white clip 36 is sent to a low pass filter 38 of the optical sensing means 18 for filtering out switching noise. The low pass filter 38 allows signals below 1.5 MHz to pass therethrough.

The output of the low pass filter 38 is sent to the control means 28 at the C-IN input and to a horizontal line delay means 40 for delaying a horizontal line of the data signal. The horizontal line delay means 40 saves one horizontal line of video data and outputs same to the control means 28 at the H-IN input. The horizontal line delay means 40 is a CCD shift array which coincidently shifts one horizontal video line until it is required to shift it out for a second line generation. The horizontal line delay means 40 of the optical sensing means 18 is standard in the art of video signal control in accordance with the NTSC.

The control means 28 controls the transfer of shift timing of the CCD 26, the iris timing for the CCD 26, the horizontal sync pulse, horizontal and vertical blanking pulse, the switching for the horizontal delay means 40, the code select 83 (NTSC 60 Hz or PAL 50 Hz) and the bias oscillator for the power supply 46. The timing of the control means 28 is resonator controlled for accuracy, such as a ceramic resonator. The control means 28 is generally implemented by integrated circuit chip 78. The control means 28 includes several stages which are indicated in FIG. 5, such as horizontal control logic and bias generator 100, irising logic 102, vertical control logic 104, and CCD FT/RT (forward or reverse transfer) control logic 106. The control means 28 includes code select means 83 for selecting between 60 Hz video output (United States or NTSC standard) and 50 Hz video output (European standard or PAL).

A ceramic resonator controlled oscillator 80 feeds a counter 108 internal to the control means 28 which controls the horizontal logic 100. This logic 100 generates the sync pulse, horizontal phase, irising logic, horizontal blanking and the oscillator for the bias output pin 12.

The irising logic 102 of the control means 28 takes information from an external irising means 42 which retains the peak voltage information from the previous frame. This level is then compared to a set level in the irising logic 102. This then generates the time ratio of FT to RT thereby setting the integration time of the CCD 26 output and thus the new peak output level or, in other words, the F stop of the iris.

The vertical control logic 104 is similar to the horizontal logic 100 in that it generates control timing signals to other areas of the assembly 10. This logic 104 uses the horizontal clock to generate its up count drive. The logic 104 generates signals such as vertical blanking, frame transfer, irising sample signals, and vertical synchronization.

The CCD FT/RT control or transfer function logic 106 generates the timing control for the CCD 26 itself. It generates the four phase image drive, the four phase storage drive, which, using the FT/RT inputs, controls the storage rate in operation time and the two phase horizontal shift rate.

The control means 28 outputs the video signal through a buffer 41 to irising means 42 and to a low pass filter 43. The irising means 42 is an electronic timing device which determines if the average video level is at a required video level and transmits the digital signal to the control means 28. The irising means 42 controls the length of time the optical image is impinged upon the image array 27 to maintain the substantial uniformity in the light level in the preliminary video signal. The digital output signal from the irising means 42 is sent to the iris input of the control means 28.

Figure 5A:
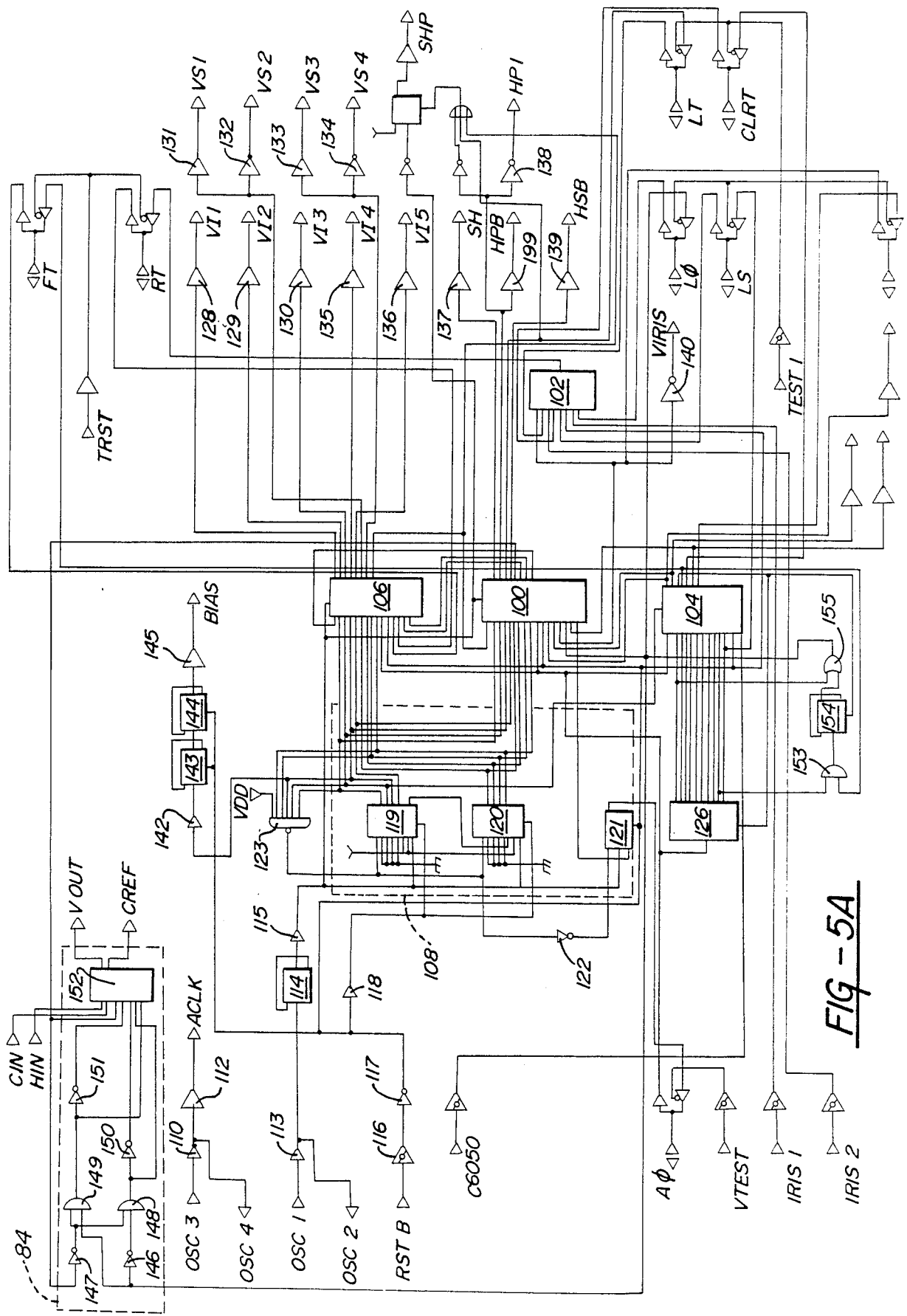
FIGS. 5A-H is a detailed schematic diagram of the control means of the transmitter means.
Figures 2, 5B:
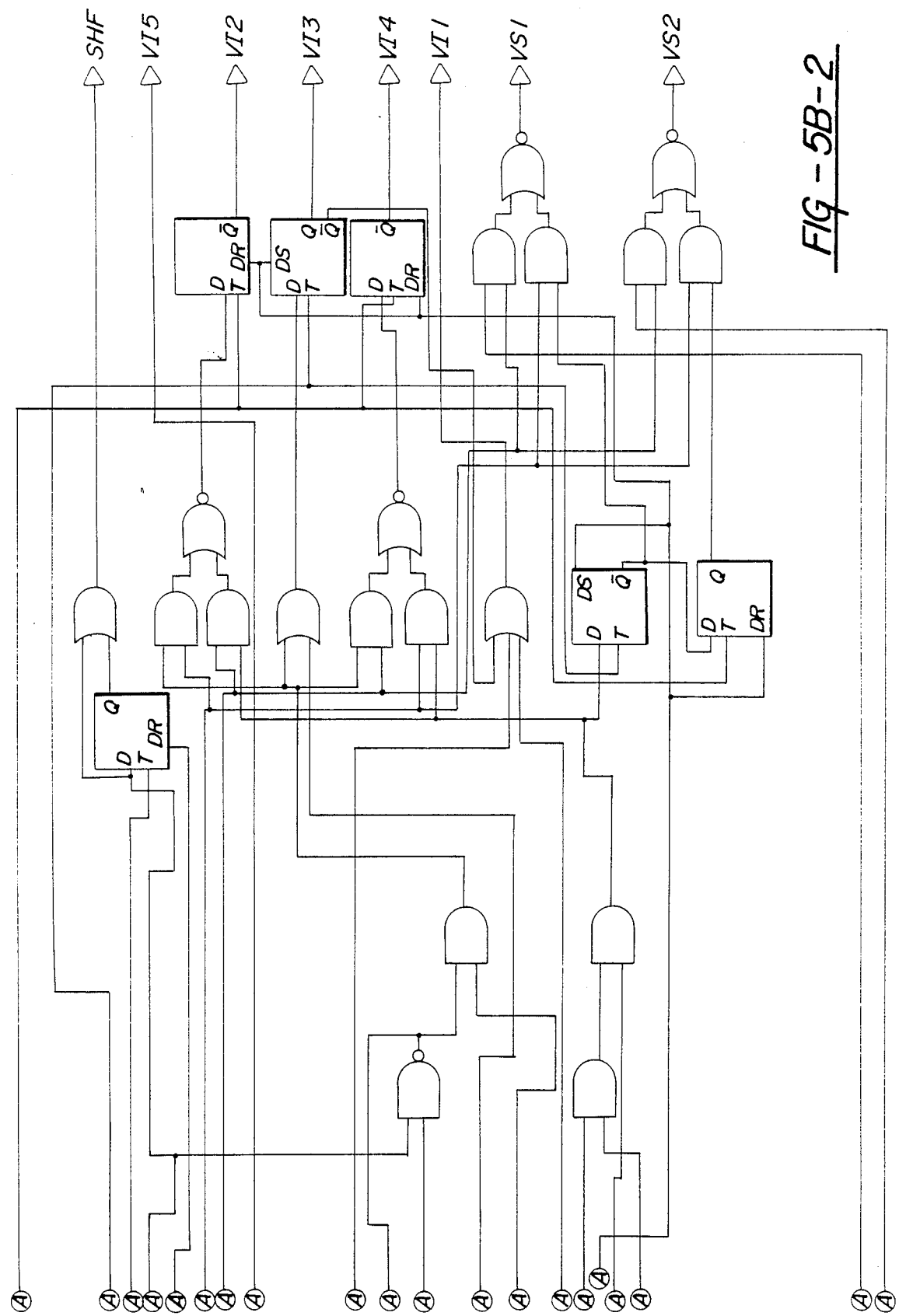
FIG. 2 is a block diagram of the optical sensing means and transmitter means on the vehicle.

As shown in FIG. 2, the output signal from the low pass filter 38 is sent to a converter means 44 for producing the electrical video signal to the track means 14 on rails 13a, 13b. The converter means 44 receives the output signal and frequency modulates the same at a predetermined frequency to transmit the electrical video signal to the track means 14 and for receiving a sync signal from the control means 28 to synchronize the converter means 44. The converter means 44 is an FM (frequency modulated) modulator which includes the function of automatic gain control (AGC) to keep the video level constant and the function of modulating the output video signal to an FM carrier. The FM modulated electrical video signal from the converter means 44 is sent through a buffer Q14 to the track means 14 on rail 13a with rail 13b grounded. The sync signal from the control means 28 is received by the converter means 44. The sync signal is summed into the AGC video signal to meet appropriate video standards (60 Hz or 50 Hz) operation.

The optical sensing means 18 also includes power supply means 46 for supplying power to the optical sensing means 18 at a plurality of predetermined voltages. The power supply means 46 also receives the biasing or clock signal from the control means 28. The power supply means 46 may receive its input by a nine (9) volt battery. In lieu of battery power, it may be possible to receive DC input supplied upon the track means 14 and convert it to the predetermined voltages. Supplying DC power to the rails 13a, 13b to drive the motor means 15 will not interfere with the FM electrical signal supply indicative of the optical image.

The optical sensing means 18 includes driver means 48 for receiving the timing signals and for controlling the charged coupled device 26. The driver means 48 is a level shifting device which receives the digital clock lines from the control means 28 and supplies the vertical clocking image and storage pulses. A phase driver means 50 is included to receive the horizontal phase signal from the control means 28 and control the horizontal clocking of the charged coupled device 26.

The receiver means 20 is coupled to the track means 14 for receiving the electrical signal therefrom and producing a video output signal to be received by the monitor 19 to visually reproduce the sensed image as the vehicle 12 moves along the track means 14 for viewing by the user of the toy vehicle 12 assembly 10. The receiver means 20 receives the electronic video signal coupled from the track means 14 through a capacitor C39 into the primary of a small RF transformer L3. This prevents DC distortion or AC carried on the track from effecting the input. The receiver means 20 includes transformer means 52 tuned to the frequency of the electrical or FM modulated signal on the track means 14 for receiving the electrical signal and producing a resultant coupled signal. The secondary L4 is tuned to the carrier frequency and directly coupled to an amplifier circuit 54. The receiver frequency is in the range of approximately 3.5 MHz or 1.5 MHz bandwidth.

The receiver means 20 includes amplifier means 54 for amplifying the coupled signal to produce an amplified coupled signal. The amplifier 54 is a transistor emitter follower circuit. The signal from the emitter follower is capacitively fed to the FM demodulator means 58. Also included is a modulator means 56 for receiving the amplified signal and frequency demodulating the same to produce the video output signal. The demodulator means 58 may be a LA 7307 Sanyo chip which receives the FM signal and converts it to an AM signal or the video signal. In the demodulator means 58, the amplified coupled signal which is input to the chip, is amplified and fed to the internal FM limiter circuit and then directed and shifted through the multiplexer to another series of filters and an amplifier to the monitor video output pin 25.

The receiver means 20 includes modulator means 56 for receiving the video signal and modulating the same to produce a radio frequency signal for a selected channel of the monitor 19. The modulator means 56 RF modulates the AM signal to an FM frequency received on U.S. channels three (3) or four (4). The output of this modulator 56 is fed through a band pass filter 60 in this range and then to the RF output jack 62. The receiver means 20 includes switch means 64 for selecting the video output signal from one of the RF modulator means 56 and the FM demodulator means 58. The jack 62 contains a switch means 66 which is activated by the presents of a connector. The switch 64 closes to supply power to the receiver 20 only when a plug is inserted to the RF output jack 62. The switch 66 connects a standard 9 volt battery to a small series path regulator control by a zener diode. Another regulator is controlled by an RF output to supply the power to the modulator means 56. To isolate the RF from the remainder of the circuit.

Figure 4A:
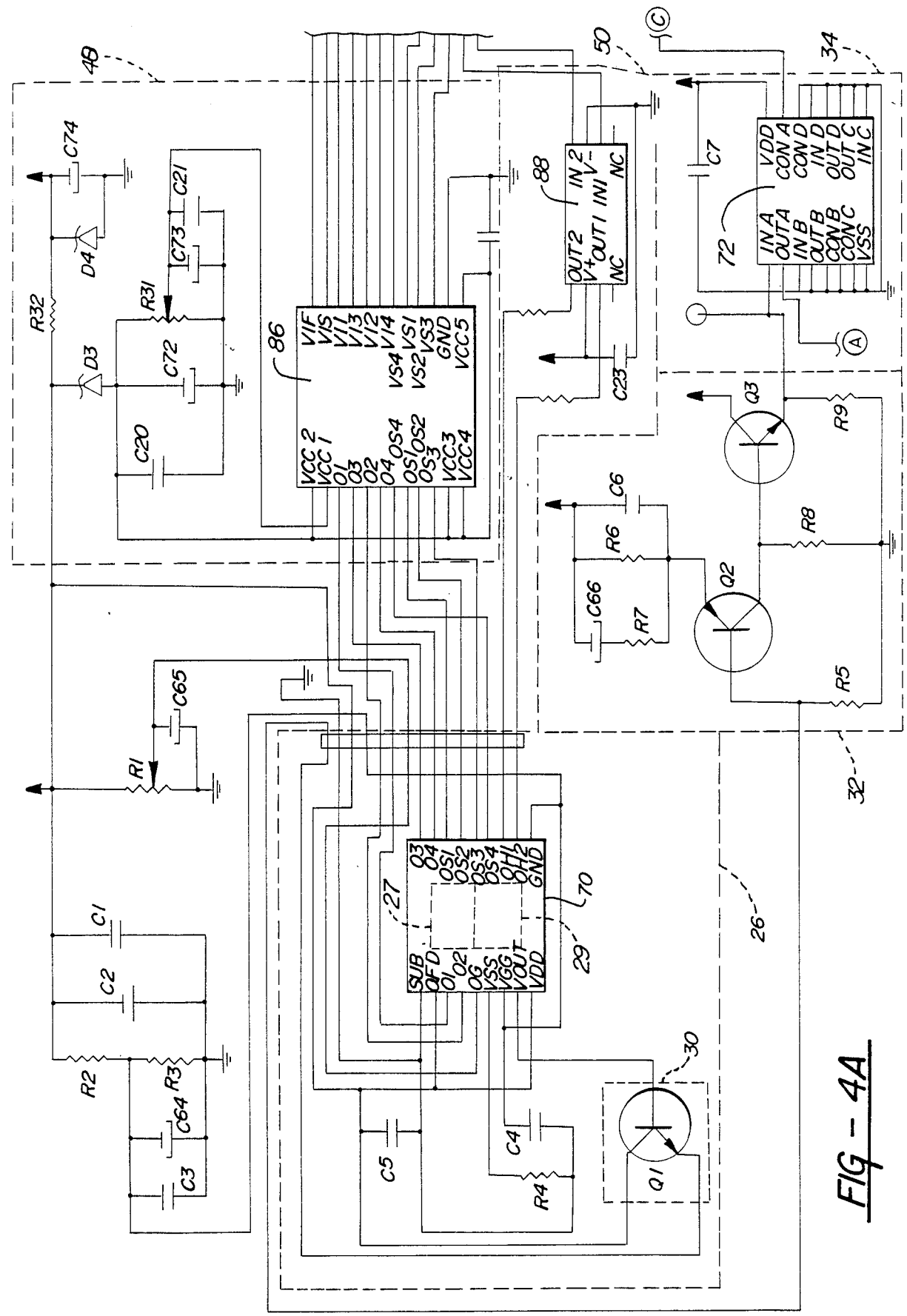
Figure 4C:
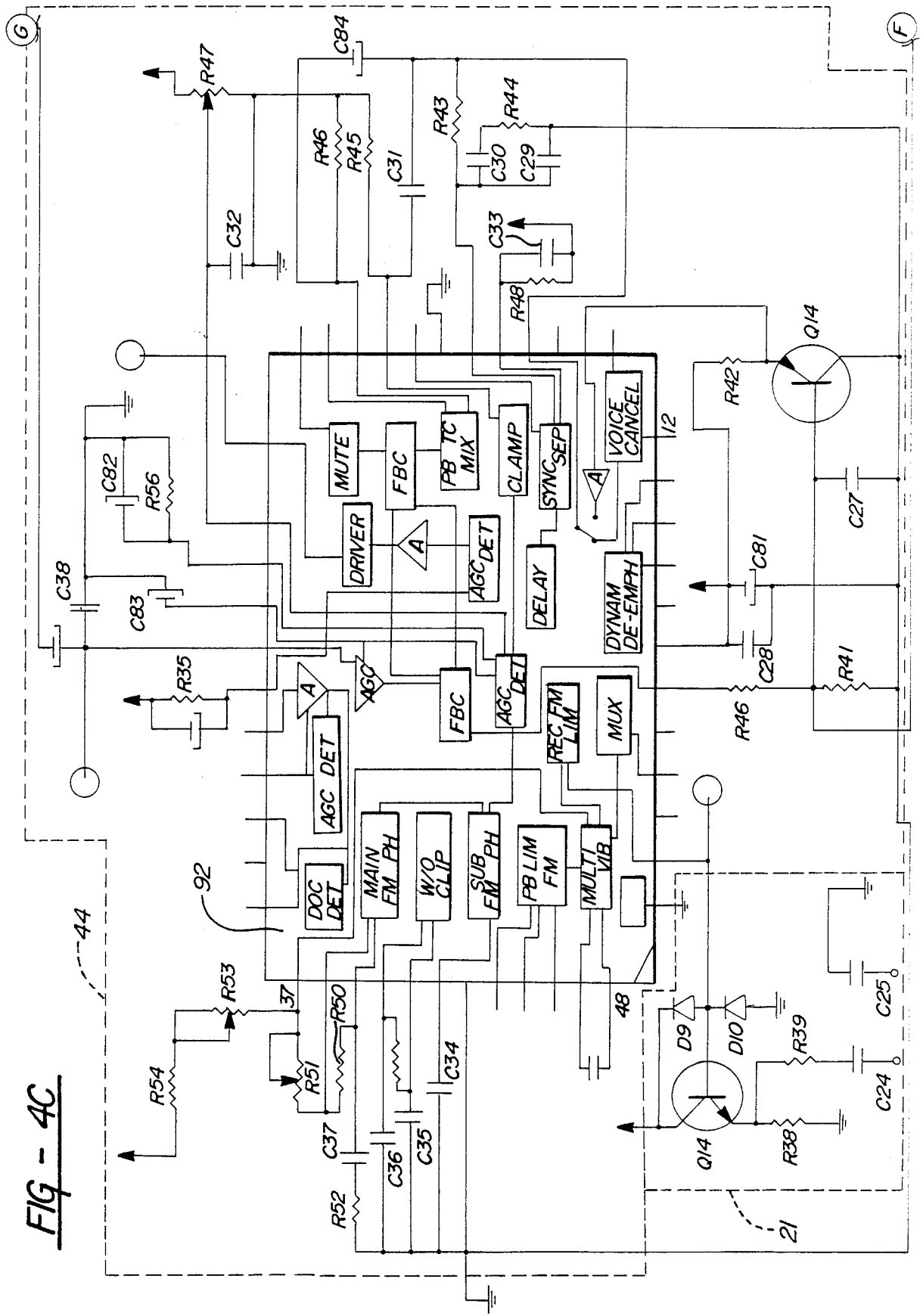
Figure 4D:
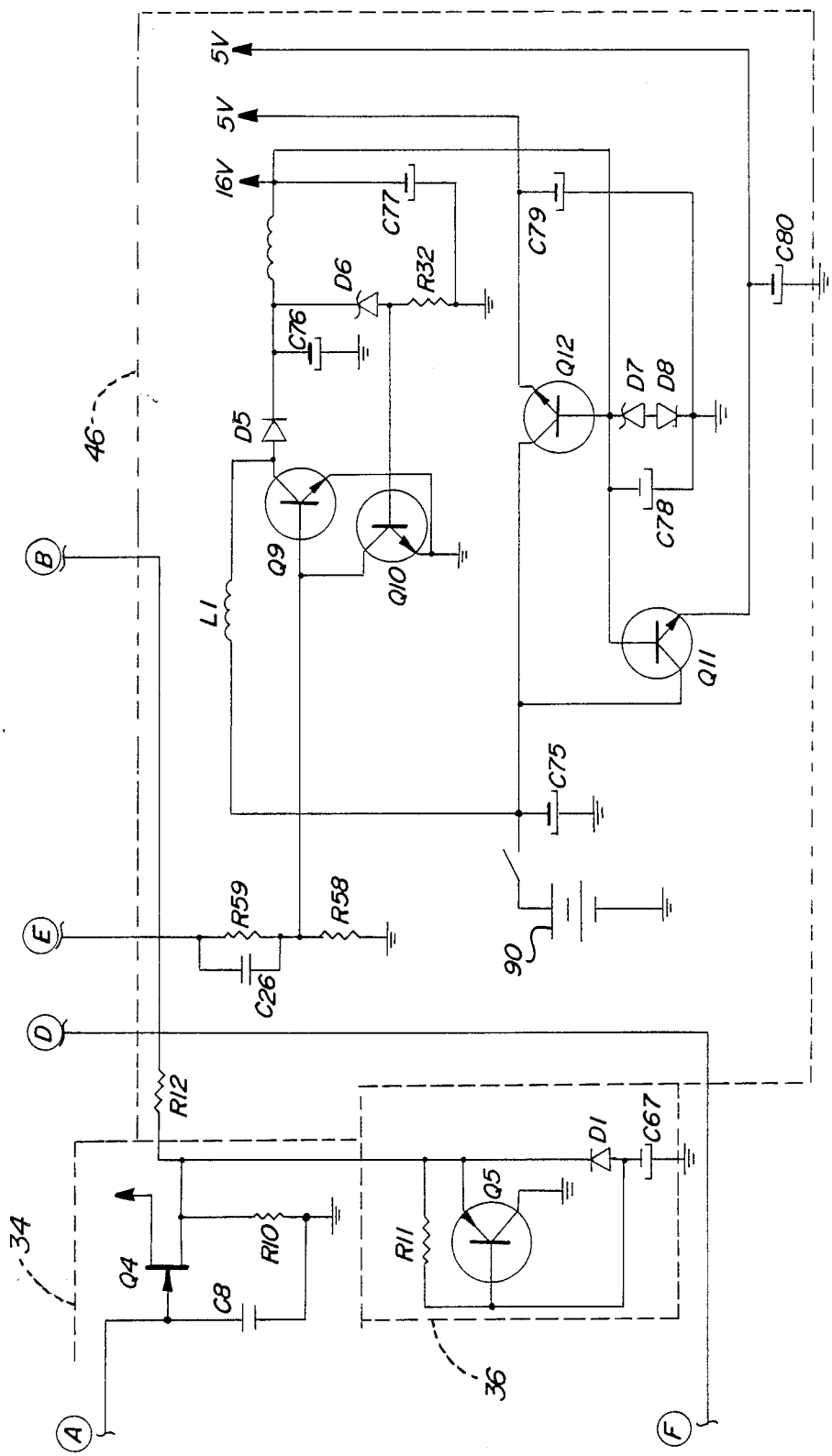

The more specific detail of the optical sensing means 18 is indicated in FIG. 4A and 4B and described below. The charged coupled device 26 includes an integrated circuit chip 70 of the type LC 9943 available from Sanyo) which is a 1/6 inch solid state image sensor. Pins 18 and 17 receive the imaging area clock, while pins 13–16 receive a storage area clock from the driver means 48. Pins 11 and 12 receive the horizontal area clock from the phase driver means 50. A sixteen (16) volt supply is connected to external voltage supply circuitry of the charged coupled device 26 which includes a variable resistor R1 attached to the CCD output gate or pin 5 of the chip 70 and tapped by capacitor C65 to ground, and a pair of parallel capacitors C1, C2 connected to the 16 volt supply and ground as a cross to resistors R2, R3 wherein the resistors R2, R3 are connected to one side of a capacitor C64 of a parallel capacitor C3 to ground. The common connection is connected to pin 10 and pin 7 of the chip. Pin 6 which is the output terminal source is connected to resistor R4 through capacitor C4 to pin 7 and to pin 1 which is connected to ground and capacitor C5 to power and pin 2 and pin 9. Pin 8 produces the CCD output which is received by a transistor Q1 at the base wherein the collector is connected to power and the emitter produces the preliminary video signal. The buffer 30 receives the preliminary video signal at the base of a transistor Q2 and resistor R5 connected to ground wherein the emitter of transistor Q2 is connected to 16 volt power through capacitor C6 and parallel with resistor R6 and in parallel with resistor R7 and capacitor C66. The collector of transistor R2 produces the output which is received by a second transducer Q3 and resistor R8 to ground. Transistor Q3 has its collector connected to 5 volt power and its emitter connected through the resistor R9 to ground and producing the output signal.

The sample and hold means 34 includes an integrated circuit chip 72 of the type HC4066 (available from Signetics) receiving the output signal from the buffer 30 at pin 1 and producing an output signal at pin 2, and receiving an enable signal on pin 13 from the control means 28. Pins 3-7 and pins 8-12 are connected to power through capacitor C7 and pins 14 are connected directly to power. The output pin 2 is connected to FET Q4 and capacitor C8 to ground wherein the source is connected to 9 volt power supply and the drain is connected through resistor R10 to ground. The drain produces the output from the sample and hold 34 for the data signal. The data signal is received by the white clip 36 which includes a transistor Q5 at its base through resistor R11 and to its emitter wherein the collector is connected to ground, the base is connected to a capacitor C67 to ground and to diode D1 to the emitter. The output from the white clip 36 is connected resistor R12 to the low pass filter 38. The low pass filter 38 comprises any well known low pass filter 38 circuit chip wherein the output is received by resistor R13 and transistor Q6 at its base and wherein the collector is connected to 5 volt supply and the emitter produces the output signal.

The output from the low pass filter 38 is received by the horizontal delay means 40 and the C-IN input on the control means 28. The horizontal delay means 40 includes resistive divider R14, R15 receiving the output signal from the low pass filter 38 through a capacitor C9 and pin 6 of integrated circuit chip 74 of the type LC8991 (available from Sanyo), which is a NTSC CCD one horizontal line delay chip 74. Pin 7 receives the clock signal through capacitor C10 and resistive divider R16, R17 from the ACLK output of the control means 28. The horizontal delay means 40 is timed using the oscillator 82 at 7.16 MHz. ACLK is capacitively coupled to the clock input pin 7 of the chip 74. The video is clocked into a CCD delay line which delays the signal for one horizontal line using the ACLK. Pin 8 is connected through capacitor C11 to ground and pin 5 is connected through capacitor C68 to ground. Pin 1 is a voltage supply pin which is connected to 9 volt supply, and pin 2 is connected to ground and through capacitor C12 to the volt supply. Pin 3 is connected to a capacitor C69 to ground. Pin 4 produces the output which is sent through a buffer comprising a variable resistor R18 which is connected to ground wherein the tap point of the resistor R18 is connected to the base of transistor Q7 having its collector connected to ground and its emitter producing an output signal disconnected through resistor R9 to 5 volt power and through capacitor C70 to the H-IN input of the control means 28.

The output pin 29 of the control means 28 is connected to a buffer 41 comprising transistor Q8 having it collector grounded and its emitter connected to resistor R20 to five (5) volt power wherein the emitter produces the output signal from the buffer 41. The irising means 42 receives this output signal through diodes D2 and resistor R21 at which point is connected to the voltage iris output from control means 28. Across this line is connected capacitor C13 to ground and to pin 3 and pin 6 of integrated circuit chip 76 of the type LM393A (available from National Semiconductor) which is a voltage comparator. The chip 76 includes two comparators or differential amplifiers for speed wired as a sample and hold drive. The chip 76 does not turn on until the divider voltage is set into the positive input is exceeded. The comparator input is reset using the vertical blanking signal from the control means. The two comparators receive the output signal from the buffer and the first of which receives a set point voltage from pin 2 by a parallel capacitor C14 connected to a variable resistor R22 through resistor R23 to power of 5 volt. The set point of the second comparator is connected through the variable resistor R22 and to resistor R24 to ground. Voltage is supplied to the chip at pin 8 and to ground at pin 4. The output of the first comparator is connected to the IRIS2 input of the control means 28 and through resistor R25 and R26 to the output of the second comparator which is connected to IRIS1 input of the control means 28. A capacitor C15 is connected across the voltage and ground pin 4. The output controls the amplitude or F stop of the video.

The control means 28 includes integrated circuit chip 78 of the type QIP-48 (available from Sanyo). The video signal from the low pass filter 38 is received through capacitor C71 at pin 28. Pins 37-48 produce the clocking for the driver means 48 and charged coupled device 26. The control means 28 includes two crystal controlled oscillators for maintaining a consistent clocking. A first crystal 80 is connected parallel with resistor R27 and to OSC1 input of the control means 28 and through resistor R28 to OSC2. Both ends of the crystal oscillator 80 are connected through capacitors C15, C17 to ground. The second crystal oscillator 82 is likewise connected across a resistor R29 and to OSC3 and to OSC4 through resistor R30, wherein a first side of a crystal oscillator 82 is connected to a capacitor C18 and a second side of the crystal oscillator 82 is connected to a variable capacitor C19, both capacitors connected to ground. An analog switch 84 is connected to the output 23 switchable between pin 27 or the H-IN and pin 28 or C-IN and reference pin C30 which is connected to ground. The analog switch 84 is standard in NTSC standards. Output pins 37 through 46 are connected to the driver means 48 which is an integrated circuit chip 86 of the type LB8900 (available from Sanyo). Output pin 3-10 of driver chip 78 are connected to the CCD chip 70 for controlling the clocking of the image array 27 and storage array 29. Pins 1, 11, 12 and 13 are connected to a power supply circuit comprising a capacitor C20 and parallel with a capacitor C72 and parallel with a variable resistor R31, capacitor C73, and parallel with capacitor C21 wherein the parallel components are connected between ground and a zener diode D3 which are a connected to a 16 volt power supply. A resistor R32 and second zener diode D4 are connected to ground with a capacitor C74 across zener diode D4. A capacitor C22 is connected to the power source to ground and to ground pin 14. The horizontal phase output pins 47 and 48 from the control means 28 are connected to integrated circuit chip 88 of the type MM 0026 (available from National Semiconductor) at pins 6 and 8 wherein pins 1 and 3 are connected to the horizontal phase of the CCD chip 70. The voltage supplied to the chip 86 at pin 10 wherein pin 7 is grounded and a capacitor C23 interconnects the pins.

Figure 5C:
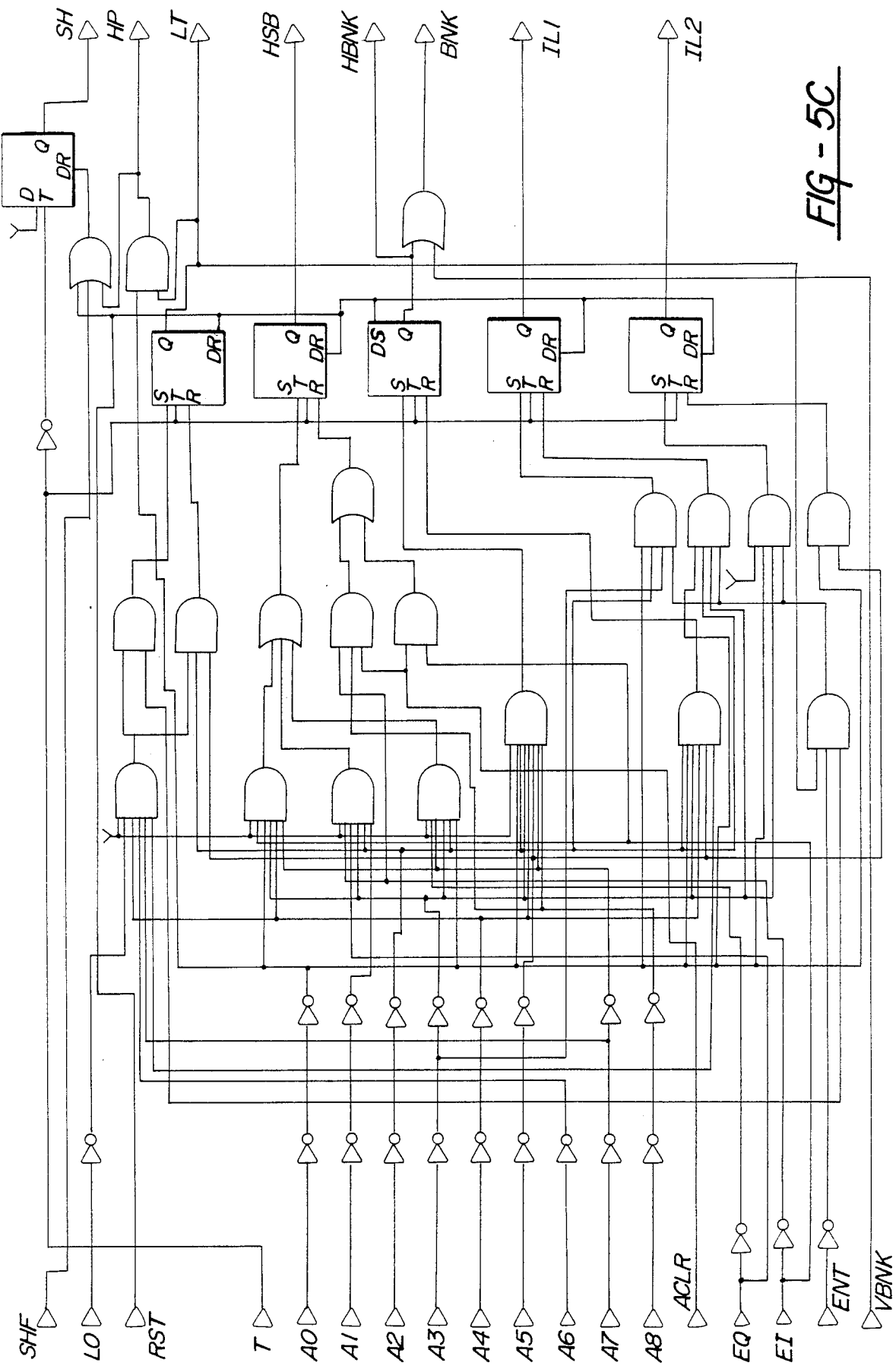
Figures 1, 5D:
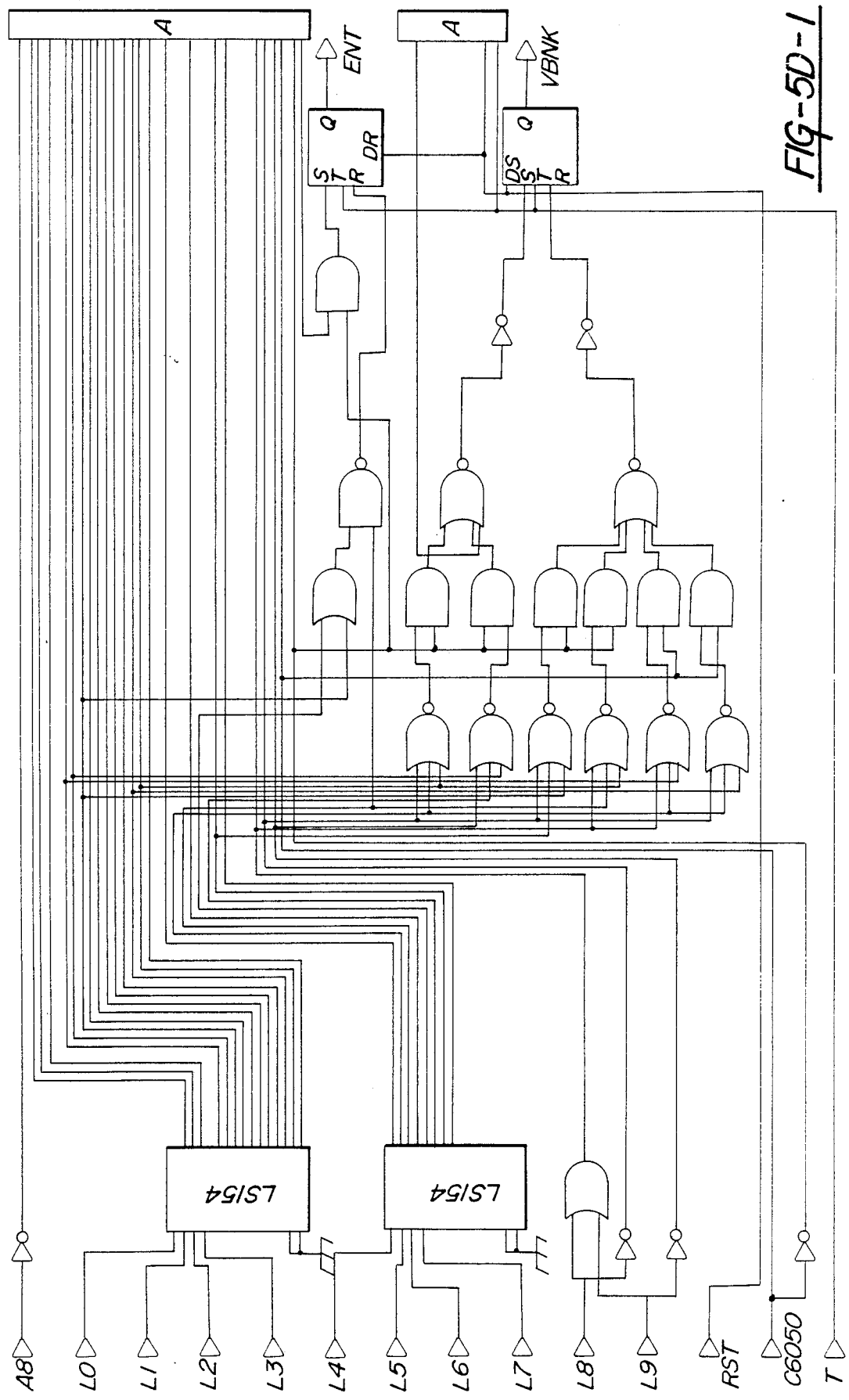
Figures 2, 5D:
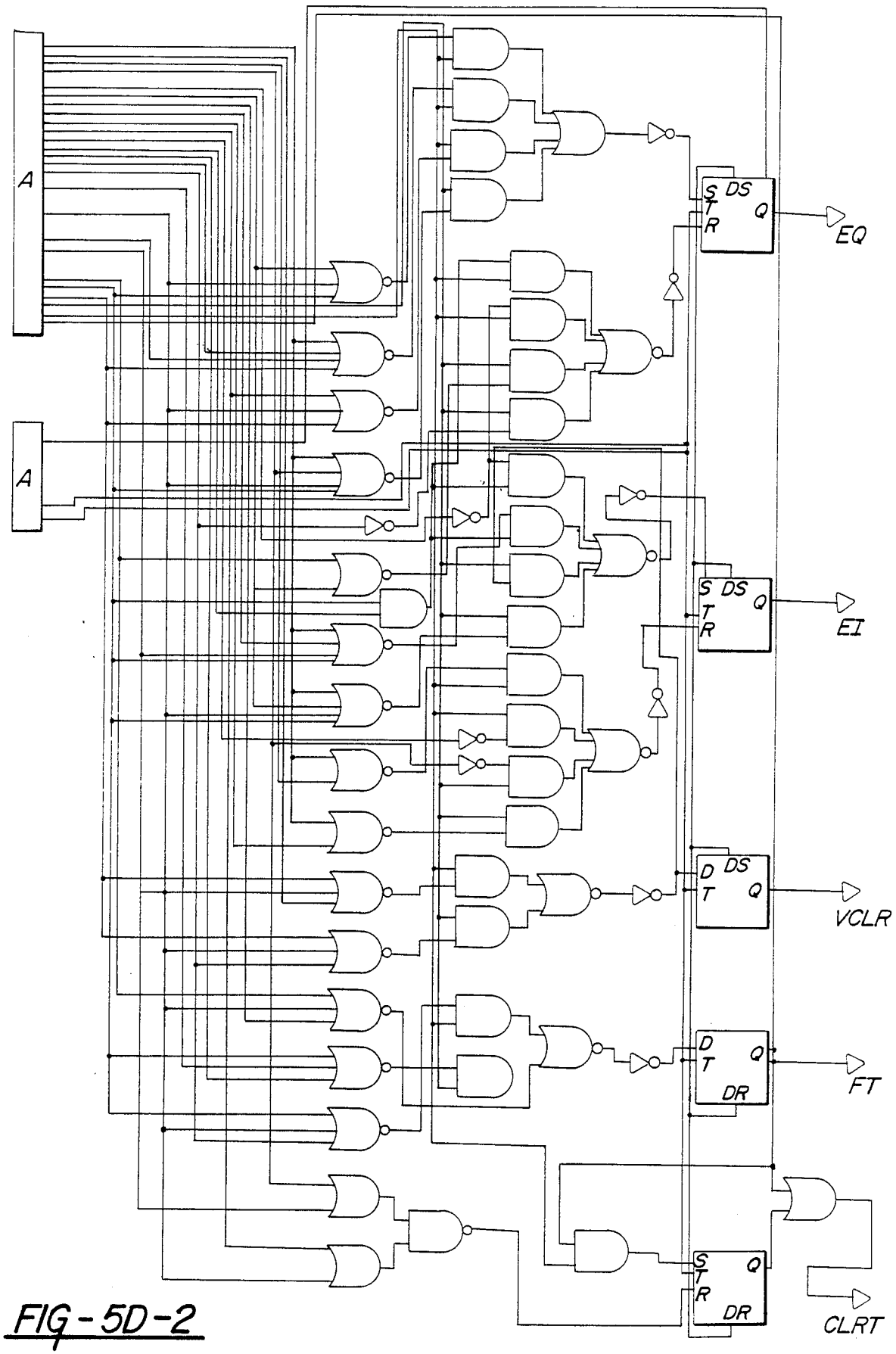
Figure 5E:
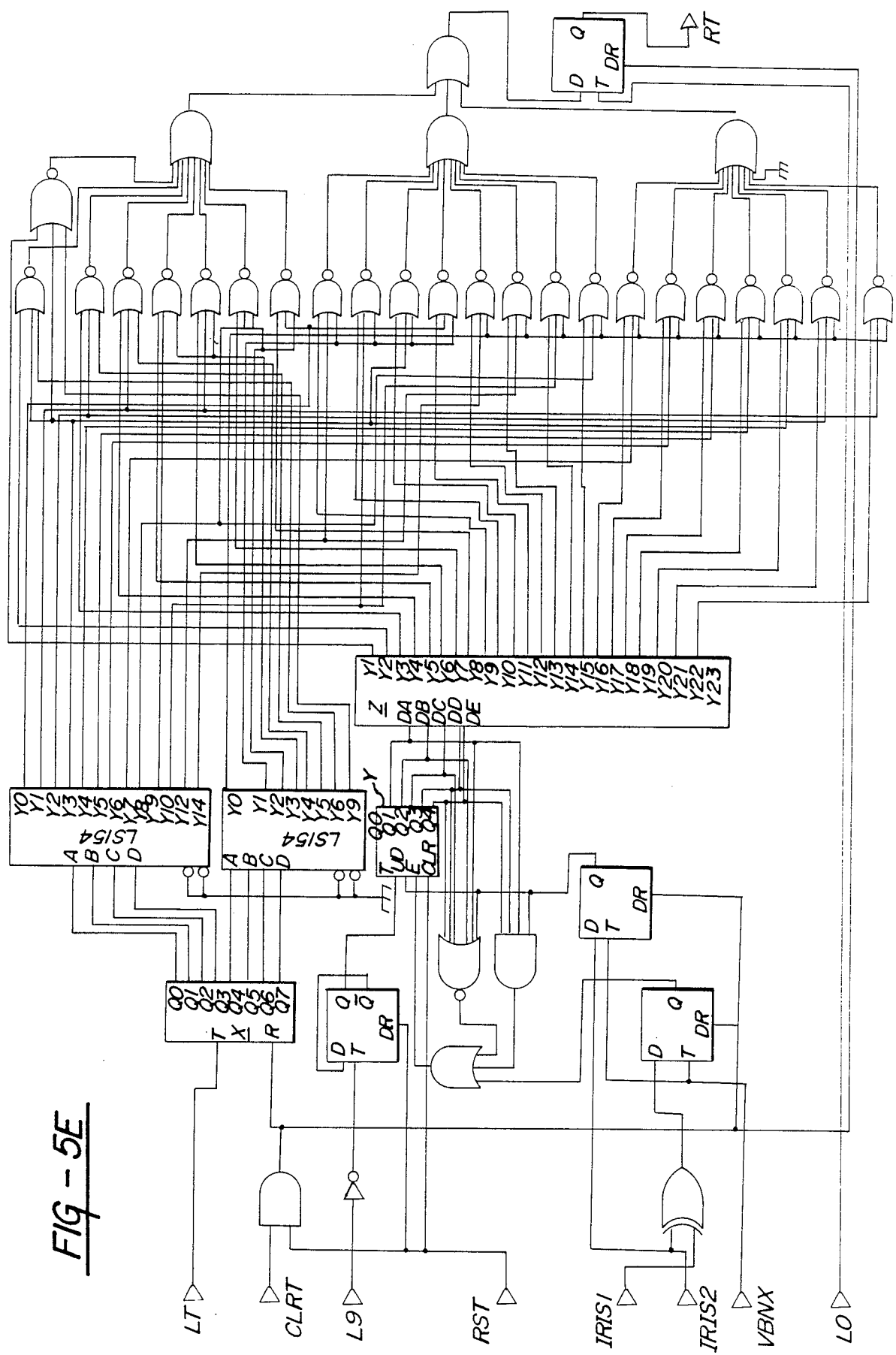

The integrated circuit chip 78 is schematically represented in FIGS. 5A–E. FIG. 5A represents the entire schematic of the chip 78, whereas FIGS. 5B-E represent the specific components of the transfer function logic or decoder means 106 (FIGS. 5B1-5B2 as mated together at points A), horizontal logic or decoder means 100 (FIG. 5C), vertical control logic or decoder means 104 (FIGS. 5D1-5D2 with lines mated together at interfaces A) and the irising logic or counter/decoder means 102 (FIG. 5E). The ceramic oscillator 82 is connected to input OSC3 pin 9 and OSC4 output pin 10. An oscillator (lower than 16 MHz) 110 has its input connected to pin 9 and output to pin 10 and on output buffer 112 to ACLK output pin 8 for producing the clock for the one horizontal delay 40. The system clock is produced by oscillator 80 at OSC1 input pin 4 and OSC2 output pin 5 and connected to oscillator 113 (lower than 16 MHz) and the output of oscillator 113 is connected to D-type flip flop 114 with clear and then to buffer 115 producing the system clock signal. The RST-B pin 24 provides the reset or clear signal through schmitt trigger 116 to inverter 117 to the clear of flip flop 114, and to inverter 118. The counter 108 includes counter 119 and counter 120 for counting 10200 and J-K flip flop 121 for providing the most significant bit for the counter which operates at 0 and 99. Counters 119 and 120 have inputs grounded, and connected to power and clocked by the system clock and cleared by the reset signal provided by inverter 48. The flip flop 121 is cleared by the clear of inverter 117 and has clock input connected to system clock and J and K inputs connected together and from inverter 122 from NAND gate 123. NAND gate 123 receives inputs from power (VDD) outputs of counters 119 and 120 for the purpose of resetting the counters 119 and 120. A ripple counter 126 receives a clock input from the output of flip flop 121 and provides a 10 bit output. Receiving the outputs of the clock 108 is a transfer function decoder 106 and horizontal decoder 100, and vertical decoder 104 receives the output of ripple counter 126 and flip flop 121. The transfer function decoder 106 is schematically illustrated in FIGS. 5B1-5B2, the horizontal decoder 100 is schematically illustrated in FIG. 5C, and the vertical decoder means 104 is schematically illustrated in FIGS. 5D1-5D2. The transfer function decoder 106 provides the CCD clocks VI1-5, VS1-4 through buffers 128-136. The horizontal decoder 100 provides the sample and hold means 72 enable signal through buffer 199 at output SH pin 36, the horizontal phases controlling the CCD 26 through buffers 137, 138 at output HP0, HP1 pins 47, 48 and the sync signal through buffer 139 at HSB output pin 16. The vertical decoder 104 provides the VIRIS signal pin 23 through buffer 140 and inputs to counter/decoder 102 which provides where the reverse transfer will occur. The counter/decoder 102 is schematically illustrated in FIGS. 5D1-5D2.

The vertical decoder 104 generates the LO (least significant bit of the ripple counter) which indicates whether H-IN or C-IN will be used in the output video signal, and where vertical blanking and vertical synchronization EI occurs. The equalization EQ is a small pulse having twice the duty cycle of one line, and the reverse equalization is the inverse. These equalization inputs are fed to the horizontal decoder 100 and indicates where to do a frame transfer of the image frame 27, and whether in 60 Hz video or 50 Hz video. Frame transfer occurs generally at two locations within a frame. Clear transfer (CLRT) and enable transfer (ENT) control the lines transfer for a predetermined amount of the frame. Whether in the 60 Hz of 50 Hz, the horizontal decoder stays the same while the vertical decoding changes as compensated by ENT and CLRT and EI. The clock/decoder 102 counts the clocks from the decoders 100, 104, 106 and decodes them determining the timing of reverse transfer or the F stop. The output of clock/decoder 102 is sent to the transfer function decoder 106 to control the reverse transfer function. The power bias output pin 12 receives its signal from a circuit comprising inverter 142 receiving the output from counter 119 to cascaded flip flops 143, 144 and to an output buffer 145 to the pin 12. A line circuit which toggles every other line includes AND gate 153 receiving the ninth bit output of ripple counter 126 and the FT output of vertical decoder 104, the output of AND gate 153 is fed to flip flop 154 and to exclusive OR gate 155 having a second input from the first bit output of ripple counter 126. The output of exclusive OR gate 155 produces the L0 output which indicates whether CIN or HIN is to be displayed. The analog switch 84 includes an inverter 146 receiving the L0 signal and a second inverter 147 receiving the blanking output from the horizontal decoder 100. An AND gate 148 receives the output of the two inverters 146, 147, and a second AND gate 149 receives the output of inverter 147 and the L0 signal. An inverter 150 receives the output of AND gate 148 and a second inverter 151 receives the output of AND gate 149. The analog switch integrated circuit chip 152 comprises five switches and receives the input from the horizontal decoder 100, inverter 151, inverter 150, and AND gate 148 for controlling the switching times and inputs to be switched art the video input CIN and the delayed video line HIN. The switches switch HIN line to the output and CIN line to CREF, CIN line to output and HIN to CREF, CREF to the output during blanking. CREF is connected to HIN and CIN in respectively to allow for dc level reference. Generally, CIN and HIN toggle or alternate down a frame, and CREF is interjected at blanking times or when no valid video. The analog switch 152 toggles every other line, for example for the 525 lines in 30 Hz the first 263 lines, CIN is interlaced first, and the second 262 lines, HIN is interlaced first.

The transfer function decoder 106 is disclosed in FIGS. 5B1-5B2 and includes the following inputs: T is the system clock; RT or reverse transfer received from the counter/decoder 102; FT or forward transfer is received from the vertical decoder 104 output FT; HBNK or horizontal blanking received from the horizontal decoder 100 at the HBNK output; RST or reset received from the RSTB input pin 24 of the chip 78; inputs A0-A7 received from counters 119 and 120; A8 which is the most significant bit from the counter 108 received from flip flop 121; IL1 and IL2 are received from horizontal decoder 100. The inputs are fed through a logic circuit as illustrated in FIGS. 5B1-5B2 which includes conventional logic of D-type flip flops with clear (DR), D-type flip flops with preset (DS), RST flip flops with preset (DS), inverters, AND and NAND gates, OR and NOR gates. The outputs of the transfer function decoder 106 include: SHF or sample and hold frequency which aids in the production of the SHP output pin 35 of chip 78; VI1-VI5 which are connected to output pins 37-41 of chip 78 and are the vertical image timing pulses for the CCD 28; and, VS1 and VS2 which are connected to output pins 42, 44, 45 and 46 of the chip 78 and produce the vertical storage timing pulses for the CCD 28.

The horizontal decoder 100 is illustrated in FIG. 5C and includes the following inputs: SHF or sample and hold frequency received from the SHF output of transfer function decoder 106; L0 which is the line determinator of delayed horizontal line or present horizontal line from the line circuit 153–155; T which is the system clock from OSC1-2 input pins 4–5; A0–A7 inputs received from counters 119 and 120; A8 is the most significant bit of counter 108 and is received from flip flop 121; ACLR is a clear received from reset AND gate 123; EQ is the equalization signal and received from the EQ output of vertical decoder 104; EI is the inverted EQ and received from the EI output of vertical decoder 104; ENT received from vertical decoder 104; and, VBNK is the vertical blanking signal and received from vertical decoder 104. The inputs are fed through a logic circuit as illustrated in FIG. 5C which includes conventional logic of D-type flip flops with clear (DR), RST flip flops with preset (DS), AND gates, OR gates and inverters. The outputs of the horizontal decoder 100 include: SH or the sample and hold output to pin 36 of chip 78; HP or horizontal phase control which is output to HP0 and HP1 pins 47–48 of the chip 78; LT output which is connected to counter/decoder 102; HSB output which is the synchronous output signal at pin 16 of the chip 78; HBNK output which is the horizontal blanking signal which is output to transfer function decoder 106; BNK or blanking signal which is output to the analog switch 84; IL1 and IL2 outputs are sent to the transfer function decoder 106.

The vertical decoder 104 is illustrated in FIG. 5D and includes the following inputs: A8 which is the most significant bit of counter 108 from flip flop 121; L0–L9 are the outputs from ripple counter 126; RST is the reset signal from input RSTB pin 24; C6050 is the frequency code from input pin 25; and, T is the system clock from OSC1-2 pins 4–5. The inputs are fed through a logic circuit as illustrated in FIG. 5D which includes conventional logic of LS154 which is a BCD-to-decimal decoder, RST-type flip flop, RST-type flip flop with preset (DS), D-type flip flop with preset (DS), AND and NAND gates, OR and NOR gates and inverters. The outputs of the vertical decoder 104 include: EQ or equalization output is sent to output pin 3 and to the EQ input of the horizontal decoder 100; EI or inverted equalization output is sent to output pin 7 and the EI input of horizontal decoder 100; VCLR or vertical clear is sent to the ripple counter 126 as a clear and to the line circuit 153–5; FT or forward transfer is sent to the line circuit 153–5 and to transfer function decoder 106; and, CLRT or transfer clear is sent to output CLRT pin 33 and counter/decoder 102.

Figure 5F:
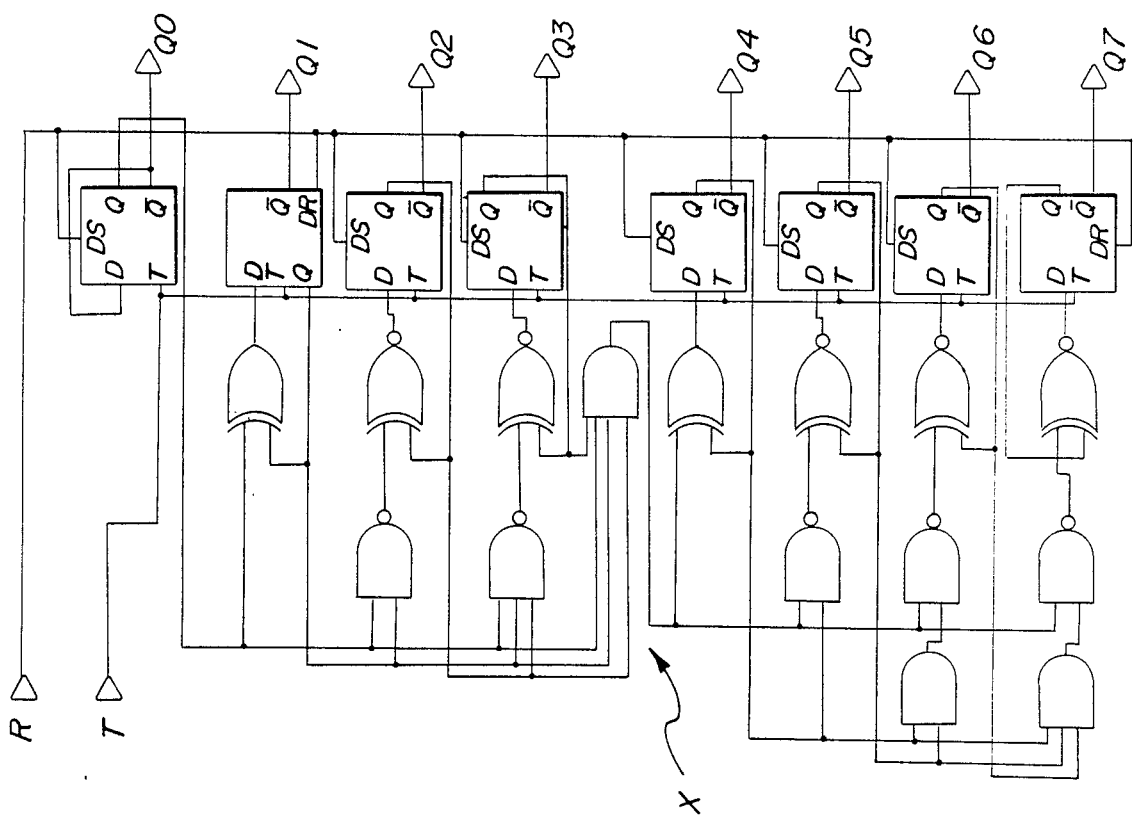
Figure 5G:
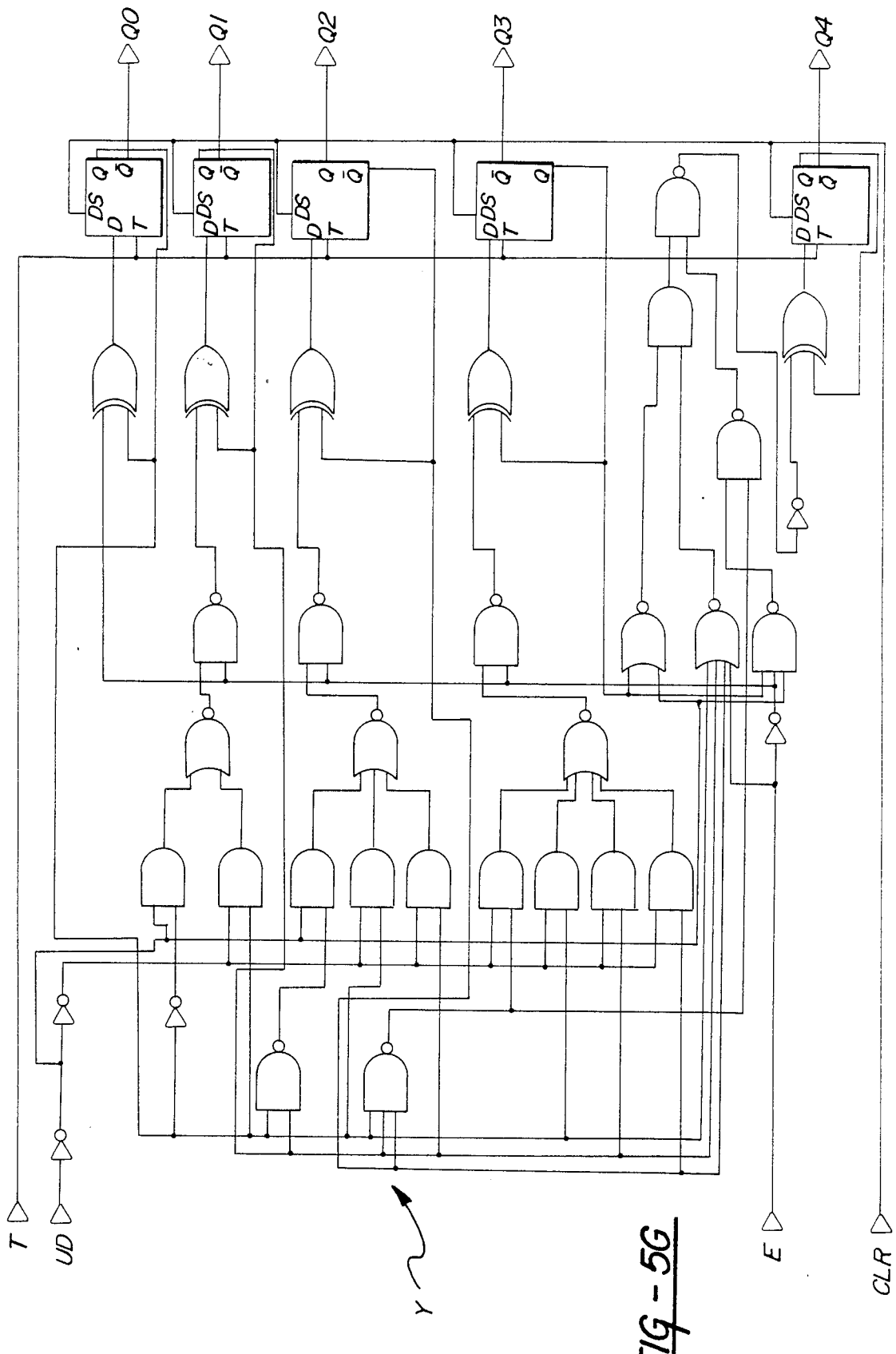
Figure 5H:
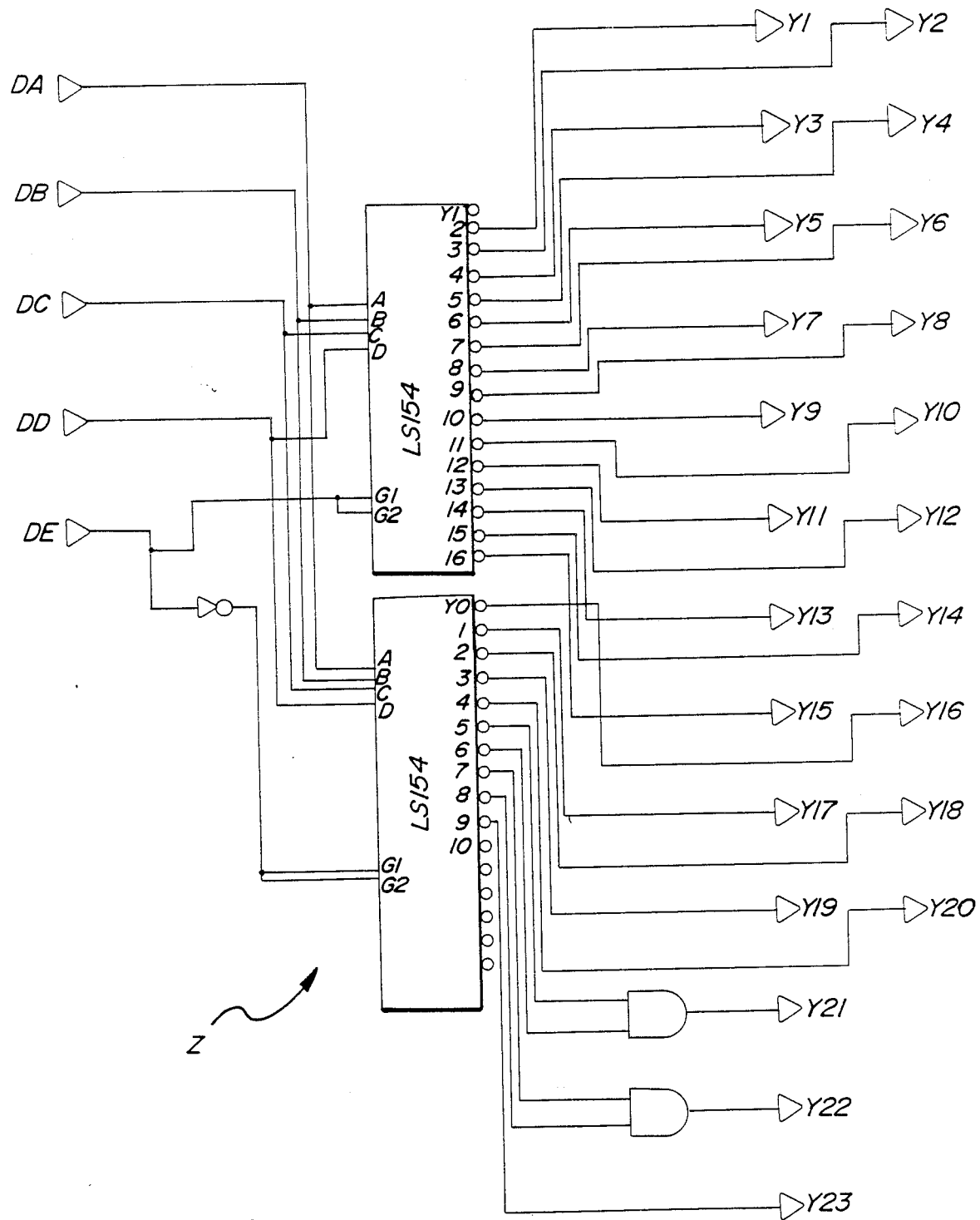

The logic of the counter/decoder 102 is illustrated in FIG. 5E and includes the inputs of: LT or line transfer is received from the LT output of horizontal decoder 100; CLRT or transfer clear is received from the CLRT output of the vertical decoder 104; L9 is received from the ripple counter 126; RST or reset input receives the RSTB input pin 24; IRIS1 and IRIS2 or irising inputs receive the input from pins 22 and 17, respectively; L0 or line signal receives its input from the line circuit 153–5. The inputs are fed through a logic circuit as illustrated in FIG. 5E which includes conventional logic of LS154 which is a BCD-to-decimal decoder, D-type flip flop with preset (DS), D-type flip flop with clear (DR), AND gates, NAND gates, OR gates, NOR gates, exclusive NOR gates, and inverters. Components X, Y, and Z are illustrated in FIGS. 5F-H. The output which is produced is RT or reverse transfer signal which is sent to the transfer function decoder 106.

The power supply means 46 generally includes separate battery pack of one 9-volt battery. This voltage is fed through a pair of simple series pass regulators controlled by a signal zener to supply the separate 5 volt supplies to the analog digital circuits. The 9 volt is fed to the top of the voltage multiplier circuit composed of an input bias oscillator signal buffered by a drive transistor and coupled into an LC relaxation multiplier. The voltage is also series pass regulated down to plus 16 volts using a zener base control. The supply is provided with an on board switch and a diode to protect the circuitry. The power supply means 46 includes a battery 90 and a capacitor C75 which is connected to a coil L1 which is connected to the collector of transistor Q9 and a diode D5. The emitter of the transistor Q9 is connected to the emitter of a transistor Q10 and to ground. The base of transistor Q10 is connected through zener diode D6 and to diode D5 and a second coil L2, a capacitor C76 is connected to the cathode of diode D5 and ground. The base of transistor Q10 is connected to resistor R32 to ground and to the other side of coil L2 via capacitor C77. The output of coil L2 is connected through resistor R33 to the base of transistor Q11 having its collector connected to the 9 volt battery supply and its emitter connected to supply 5 volt. The collector of transistor Q11 is also connected to the collector of transistor Q12 wherein the emitter produces a second 5 volt supply, wherein the base of transistor Q12 is connected through zener diode D7 to diode D8 to ground. Capacitor C78 is connected across the diodes D7, D8 to ground and capacitor C79 is connected to the emitter of transistor Q12 and ground. Capacitor C80 connects the emitter of transistor Q11 to ground. The output of coil L2 produces the 16 volt supplied which is set at the zener voltage.

The output signal from the buffer 41 is received through resistor R34 to a low pass filter 43 and a cross resistor R35 which is connected to ground and across the base and collector of transistor of Q13 wherein the emitter is connected to a voltage divider comprising resistors R36, 37 and to the input the converter means 44. The converter means 44 comprises integrated circuit chip 92 of the type LA 7307 and receives the input at pin 30. Bias signal to the control means 28 is received through the power supply means 46 through resistive divider R58, R59 connected to transistor Q9 and having a capacitor C26 connected across resistor R59 and connected to pin 12 of the control means chip 78. The frequency modulated output signal is output pin 48 and to the base of transistor Q14 wherein the base and the collector are interconnected diodes D9 and the base connected to ground through diodes D10. The emitter of transistor Q14 is connected to transistor R38 to ground and to resistor R39 which is capacitivly coupled by a capacitor C24 to the rails and ground is capacitivly coupled through capacitor C25 to a second rail.

The sync signal is produced by circuit connected to pin 6 of the converter means 44 chip and connected to resistor R40 to resistor R41 to ground, a capacitor C27 is across the base and collector of transistor Q15 having its collector grounded and its emitter connected to pin 14 and to resistor R42 to input pin 7, and to capacitors C28, C81 to ground, and to input pin 14. Output pin 16 is connected to resistor R43 to input pin 18 and to capacitors C29, C30 across resistor R44. Pin 16 is also connected to pin 21 through capacitor C31 and to pin 22, and through capacitor C84. A pair of resistors R45, R46 are connected to pins 21, 22 and ground. Pin 26 taps a variable resistor R47 and is connected to capacitor C32 to ground. Pin 17 is connected to parallel capacitor C33 and resistor R48 to power. Pin 43 is connected to ground and pin 32 is connected to ground via capacitor C34. Pin 41 is connected to ground via capacitor C35 and to resistor R49 to pin 40. Pin 40 is connected to ground via capacitor C36. Pin 39 is connected to ground via capacitor C37 and resistor R52, and to resistor R50 to pin 38. Pin 38 is connected to variable resistor R51 to pin 37. Pin 37 is connected to variable resistor R53 through resistor R54 to power. Pin 31 is connected to power via resistor R55. Pin 29 is connected to ground via capacitor C83. Pin 28 is connected to ground through parallel resistor R56 and capacitor C82. Input pin 30 is connected to capacitor C38 to ground.

Figure 6:
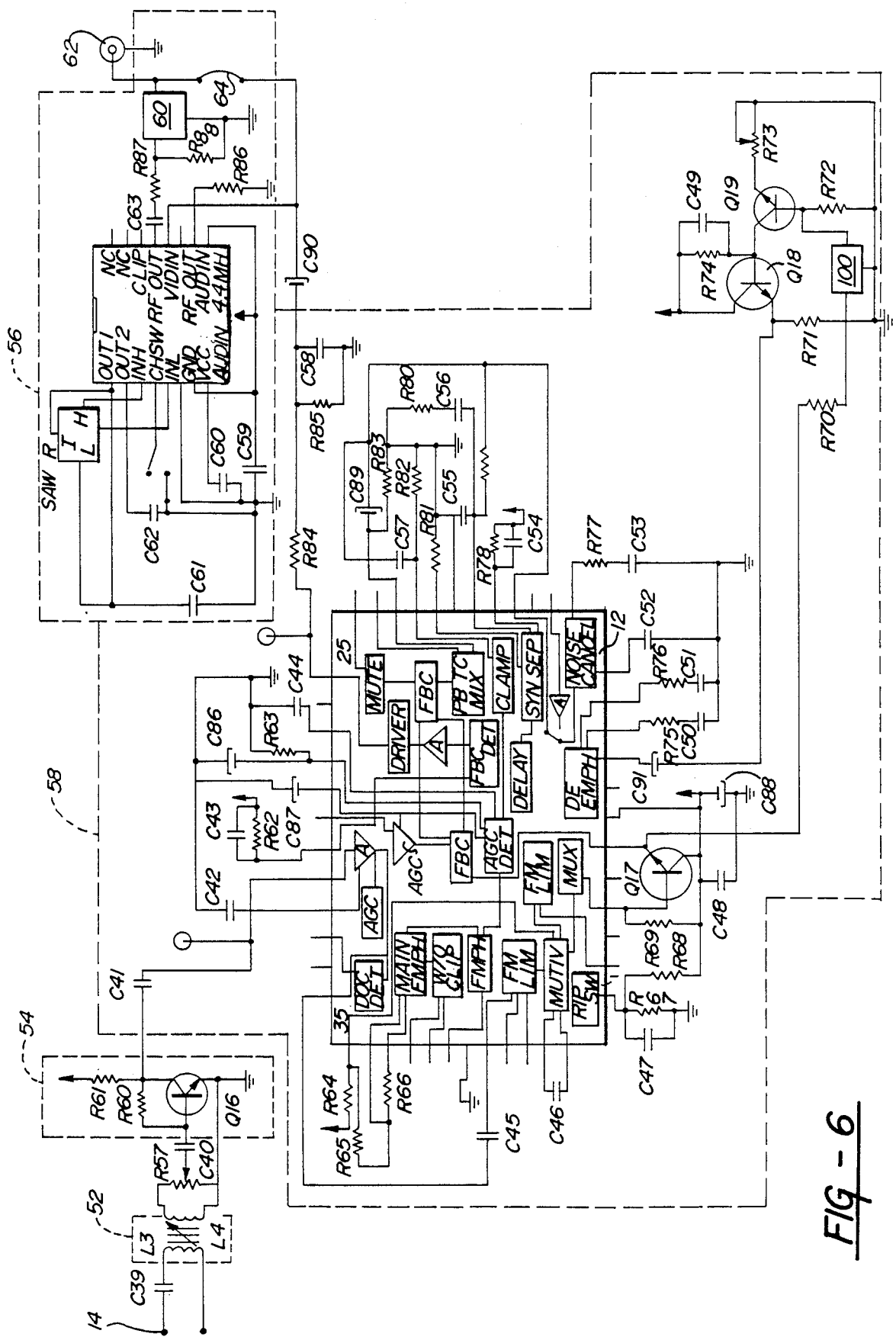
FIG. 6 is a detailed schematic diagram of the receiver means.

As illustrated in FIG. 6, the receiver means 20 includes a primary coil L3 capacitively coupled to the track means 14 by capacitor C39. A secondary coil L4 is coupled to the first primary coil L3. A variable resistor R57 is connected across the coil L4 tapped by capacitor C40. A transistor Q16 has its base connected to the capacitor C40 and a resistor R60 connected across its base and collector to power through resistor R61 and the emitter is grounded. The collector produces the signal via capacitor C41 to the input of the modulator chip 94 of the type LA 7307 (available from Sanyo).

The signal is output at pin 34 and connected to pin 42 via capacitor C45. The internal multivibrator includes a timing capacitor C46 connected between pins 45 and 46. The internal multivibrator is connected to an internal multiplexor which outputs a signal at pin 4. A resistor R69 is connected between pin 4 and resistor R68 to pin 1. A parallel capacitor C47 and resistor R67 is connected between pin 1 and ground. Pin 4 is also connected to the base of transistor Q17 having its collector connected to resistor R69 and to parallel capacitors R48, R88 to ground. The emitter is connected to pin 6 and resistor R70 to low pass filter 100. The output of the low pass filter 100 is connected through resistor R72 to gnd, and to the base of transistor Q19. Transistor Q19 has its emitter connected to variable resistor R73 to ground, and its collector connected to base of collector Q18. The transistor Q18 has its emitter connected through resistor R71 to ground, and its collector to ground, wherein the base is connected to parallel capacitor C49 and resistor R74 to ground. The emitter of transistor R74 to ground. The emitter of transistor Q18 is connected through capacitor C91 to pin 9. Pin 10 is connected through resistor R75 and capacitor C50 to ground. Pin 11 is connected through resistor R76 and capacitor C51 to ground. Pin 12 is connected through capacitor C52 to ground, and pin 13 is connected through resistor R77 and capacitor C53 to ground. Pin 35 connected through resistor R64 to power, and resistor R64 and power are connected to pin 36 via resistor R65 and to pin 37 via resistors R65 and R66. Pin 41 is grounded. Pin 16 is connected through capacitor C89 to pin 22 and through capacitor C57 to pin 21, and through resistor R79 to pin 18. Pin 17 is connected to parallel capacitor C54 and resistor R78 to power. Pin 18 is also connected through capacitor C55 to ground. Pin 19 is connected to ground, and pin 20 is connected through resistor R81 to ground. Pin 21 is connected through resistor R82 to ground. Pin 22 is connected through resistor R83 to ground, and to capacitor C89 to pin 16. Pin 33 is connected to capacitor C86 to ground and through resistor R63 to ground, pin 27 is connected through capacitor C44 to ground, and pin 31 is connected to parallel resister R62 and capacitor C43 to ground.

The demodulated signal is output on pin 25 and through resistor R84 to parallel capacitor C58 and resistor R85 to ground, and through capacitor C90 to switch 64 and to the input of modulator means 56, which is an integrated circuit chip 96 of the type LA 7055 (available from Sanyo) having the input at pin 12. Chip 96 has pins 7 and 9 connected to power and capacitor C59 to ground. Pin 8 is connected through capacitor C60 to ground, and pin 6 is ground. Pin 1 is connected to ground through capacitor C61, and pin 2 is connected to ground through capacitor C62. Pin 4 is connected to a switch for selecting channel three (3) or four (4). Pins 1, 3, 5 are connected to chip 98 to ground. Pin 10 is connected through resistor R86 to ground. The output video signal on pin 13 is sent through capacitor C63 to resistor R87 through a band pass filter 60, and through resistor R88 to ground. The output of the low pass filter 99 and the switch 64 are connected to the output jack 62 adapted to be connected to the monitor 19.

In operation of the toy vehicle assembly 10, the CCD control lines pins 37-46 from the control means 28 are coupled to the level shifting driver means 48 to the control inputs of the CCD. Two outputs are used to control the image clock voltage to prevent overflow. The blank output leading edge is used to shut off the output gate on the CCD 26 to obtain a true black level for references. Since the driver means 48 is not strong enough to handle the phased horizontal drive requirements, the phase driver means 50 is used for the horizontal phase input to the CCD. The driver chip 86 receives 0-5 volt clocks and level shifts them to 0-9 or to 12 volt clocks. The storage array 29 and image array 27 of the charged coupled device 26 are clocked together. The charged coupled device 26 generally includes 120 rows and 60 columns active cells in the image array and in the storage array. The rows are shifted down line-by-line into the storage array 29. Frame transfers are accomplished in either one sixtieth or one fiftieth of a second, which is standard video. The charged coupled device 26 is also able to do reverse transfer which is controlled by the irising means 42 in which the charge of the capacitors goes off the top of the image array 27 and not into the storage array 29. This is accomplished between each line in order to correct the amount of light impinged upon the image array 27. The horizontal line clocks shift or clock the data out of the line buffer and produce the preliminary video signal. The preliminary video data is received by the preamplifier means 32 which is a voltage follower and multiplies by five (5) and by the sample and hold means 34 and to the FET Q4.

The preliminary video signal with blanking (horizontal and vertical) is now fed through a FET isolation circuit to the converter means 44. The horizontal pulse clocks show upon the preliminary video signal from the charged coupled device 26 which are very large in relation to the data signal. We wish to sample only the video and take out the clocks. The sample and hold means 34 is a timed event with respect to the CCD character clocks HP0, HP1. After a predetermined time after the HP0, HP1 clocks, the video will reach the sample and hold means 34. In more particularity, the switch is turned on and the capacitor C7 charges and closes the switch and holds the charge until the next cell. Therefore, the clocks are eliminated and only the data signal is continued on the output. The signal is then sent through the white clip 36 which eliminates the peaks as does the amplifiers gain control of the converter means 44 attempting to keep the signal level in uniformity. The low pass filter 38 eliminates any switching noise. The output of the sample and hold means 34 is fed into the iris input of the control means 28 to control the amplitude or F stop of the video. The data signal is fed to the horizontal delay means 40 and the input to the control means 28 at the analog switch 84. The horizontal delay means 40 is timed using a small ceramic oscillator 82 at 7.16 MHz. The output of this oscillator 82 is fed through ACLK. This is capacitively coupled to the clock input of the horizontal delay means 40. The video is clocked into the CCD delay line which uses the ACLK for delaying the signal for one horizontal line. The output is then fed via a small amplifier buffer Q7 to another input of the analog switch 84 of the control means 28.

The control means 28 includes the CREF, C-IN and H-IN which are tied together by the analog switch 84. During active video, the C-IN or H-IN is switched and during blanking, the CREF input is used. The analog switch 84 controlled output is used and thus gives the two line interlace for the video. The video is sent through a 1.5 MHz low pass filter 43 to eliminate carrier clock signal. The converter means 44 is basically a voltage to frequency chip which has an internal Automatic Gain Control (AGC) which is also used for irising. The converter means 44 uses an internal multivibrator for setting center frequency of the FM signal. The incoming signal is amplified, and AGC controlled. The signal is fed through a multiplexing control circuit of the converter means 44 and a low pass filter 38 to a small mixer circuit where the horizontal sync is added. This combined signal is fed back into an internal amplifier and then through a series of filters into an AGC detector and the modulator for the multivibrator. The output of the multivibrator is fed through an internal limiter to an external capacitor which couples the FM video to the track 14.

Capacitor C13 of the irising means 42 is a frame integrator for frame brightness and the comparators determine whether too bright or too dark. The variable resistor R22 sets the level. The sync signal from the converter means 44 is received by the control means 28 in order for the control means 28 to take the video level in sync with the converter. The converter means 44 uses a standard VCR chip 92 which sends the signal out to the rail or track 14.

Although the toy vehicle assembly 10 has been illustrated hereinabove with the optical charge coupled device 26 (CCD) positioned on the front of the toy vehicle 12 (toy train), those skilled in the art will appreciate that the CCD 26 can be disposed elsewhere on the toy vehicle (e.g. on the rear or sides of the locomotive TL or on the front, rear or sides of other cars comprising part of the toy train). Moreover, those skilled in the art will appreciate that multiple charge coupled device 26 may be employed on the same toy vehicle to provide different views from the toy vehicle for viewing by the user of the toy vehicle.

Those skilled in the art will appreciate that the toy vehicle 12 may comprise multiple wheeled components connected together (such as the toy train illustrated as having locomotive TL, tender car TC and other cars) or may comprise a single toy vehicle such a toy automobile, truck and the like. The invention is not limited to any particular vehicle configuration or construction.

Moreover, when the toy vehicle comprises multiple cars (such as the toy train illustrated), those skilled in the art will appreciate that all of the components of the video system can be located on one car (e.g., on the locomotive TL) or alternatively, some of the components of the video system can be located on one car while other components are located on one or more other cars. For example, the CCD 26, filter 22, lens 24 etc. can be disposed on train locomotive TL while the other video system components can be located on the tender car TC and interconnected by suitable lead wires or connections.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A toy vehicle assembly, comprising;
   track means for receiving an electrical video signal and transmitting said electrical video signal,
   a toy vehicle having wheel means on said track means for moving said vehicle along a path defined by said track means,
   said vehicle including optical sensing means for sensing an optical image as said vehicle moves along said path and for producing the electrical video signal representative of said sensed image and transmitter means for supplying said electrical video signal to said track means, and
   receiver means coupled to said track means for receiving said electrical video signal therefrom and producing a video output signal to be received by a monitor to visually reproduce the sensed image as said vehicle moves along said track means for viewing by the user of said toy vehicle assembly.

2. An assembly as set forth in claim 1 further characterized by said optical sensing means including a charge coupled device for sensing image-forming radiant energy external of the vehicle as it moves along said track means and producing lines of the image serially in a preliminary video signal.

3. An assembly as set forth in claim 2 further characterized by said charge coupled device including an image array for sensing said radiant energy and a storage array for storing the sensed image in lines of a frame, said image array shifting information into said storage array for producing said preliminary video signal.

4. An assembly as set forth in claim 3 further characterized by said optical sensing means including irising means for controlling the length of time said optical image is impinged upon said image array to maintain substantial uniformity in the light level in the preliminary video signal.

5. An assembly as set forth in claim 4 further characterized by said optical sensing means including sample and hold means for receiving said preliminary video signal and removing the timing signal from said preliminary video signal to produce a data signal.

6. An assembly as set forth in claim 5 further characterized by said optical sensing means including horizontal line delay means for delaying a horizontal line of said data signal.

7. An assembly as set forth in claim 6 further characterized by said optical sensing means including clock means for producing a continuous timing signal to control the operation of said optical sensing means.

8. An assembly as set forth in claim 7 further characterized by said optical sensing means including control means for controlling said charge coupled device in response to said irising means and said clock means and a sync signal, and for producing an output signal indicative of the image in response to said horizontal line delay means and said data signal.

9. An assembly as set forth in claim 8 further characterized by said optical sensing means including converter means for receiving said output signal and modulating same at a predetermined frequency to produce said electrical signal supplied to said track means and for producing said sync signal to synchronize said optical sensing means.

10. An assembly as set forth in claim 9 further characterized by said optical sensing means including power supply means for receiving battery power and supplying power at predetermined voltages to said optical sensing means.

11. An assembly as set forth in claim 10 further characterized by said optical sensing means including driver means for receiving said timing signals and controlling said charge coupled device.

12. An assembly as set forth in claim 1 further characterized by said receiver means including transformer means tuned to the frequency of said electrical signal on said track means for receiving said electrical signal and producing a coupled signal while preventing interference between said electrical signal and power on said track means.

13. An assembly as set forth in claim 12 further characterized by said receiver means including amplifier means for amplifying said coupled signal producing an amplified signal.

14. An assembly as set forth in claim 13 further characterized by said receiver means including demodulator means for receiving said amplified signal and demodulating same to produce said video output signal.

15. An assembly as set forth in claim 14 further characterized by said receiver means including modulator means for receiving said video signal and modulating same to produce a radio frequency signal for a selected channel of the monitor.

16. An assembly as set forth in claim 15 further characterized by said receiver means including switch means for selecting the video output signal from one of said modulator means and said demodulator means.

17. An assembly as set forth in claim 1 or 16 further including power means for supplying power to said track means to power an electrical drive motor on said vehicle.

18. An assembly as set forth in claim 17 further characterized by said receiver means including transformer means tuned to the frequency of said electrical signal on said track means for receiving said electrical signal and producing a coupled signal while preventing interference between said electrical signal and DC power on said track means.

19. An assembly as set forth in claim 1 wherein said vehicle comprises a toy train.

20. A toy vehicle assembly, comprising;
track means for receiving an electrical video signal and a power signal and transmitting said electrical video signal and said power signal,
a toy vehicle having electrical motor means powered by said power signal and wheel means disposed on said track means and driven by said motor means for moving said vehicle along said track means,
said vehicle including optical sensing means for sensing an optical image formed of radiant energy external of said vehicle as said vehicle moves along said track means and for producing the electrical video signal representative of said sensed image and transmitter means for supplying said electrical video signal to said track means,
said optical sensing means including a charge coupled device for receiving said radiant energy forming said optical image and producing lines of the image serially in said electrical signal, and
receiver means coupled to said track means for receiving said electrical video signal therefrom and producing a video output signal to be received by a monitor to visually reproduce the sensed image as said vehicle moves along said track means for viewing by the user of said toy vehicle assembly.

21. An assembly as set forth in claim 20 further characterized by said receiver means including means for preventing interference between said power signal and said electrical video signal.

22. An assembly as set forth in claim 19 wherein said vehicle comprises a toy train.

* * * * *

UNITED STATES PATENT AND TRADEMARK OFFICE
CERTIFICATE OF CORRECTION

PATENT NO. : 4,986,187
DATED : January 22, 1991
INVENTOR(S) : Roger Booth and Thomas D. Heidt It is certified that error appears in the above-identified patent and that said Letters Patent is hereby corrected as shown below:

On the title page:

Item [73], after "Assignee:" delete Lionel Trains, Inc., Mt. Clemens, Mich. and insert --James C. Wickstead, Cedar Knolls, New Jersey--.

Signed and Sealed this

Eleventh Day of August, 1992

Attest:

DOUGLAS B. COMER

*Attesting Officer*     *Acting Commissioner of Patents and Trademarks*

UNITED STATES PATENT AND TRADEMARK OFFICE
CERTIFICATE OF CORRECTION

PATENT NO. : 4,986,187

DATED : January 22, 1991

INVENTOR(S) : Roger Booth, Thomas D. Heidt

It is certified that error appears in the above-identified patent and that said Letters Patent is hereby corrected as shown below:

```
Column 5,  line 63, delete "effecting" and insert
             --affecting--;
Column 6,  line 31, delete "presents" and insert
             --presence--;
Column 6,  line 37, delete ".  To" and insert --to--;
Column 6,  line 42, after  "70" insert --(--;
Column 7,  line 61, delete "it" and insert --its--;
Column 8,  line 6, after "voltage", delete "is";
Column 8,  line 12, after "to" insert --a--;
Column 8,  line 12, delete "volt" and insert --volts--;
Column 8,  line 55, after "are" delete "a";
Column 8,  line 64, after "voltage" insert --is--;
Column 9,  line 11, delete "on" and insert --an--;
Column 9,  line 68, after "Hz" delete "of" and insert
             --or--;
Column 10, line 32, delete "art" and insert --at--;
Column 10, line 40, after "when" insert --there is--;
Column 12, line 43, after "input" insert --of--;
Column 13, line 42, delete "gnd" and insert --ground--;
```

UNITED STATES PATENT AND TRADEMARK OFFICE
CERTIFICATE OF CORRECTION

PATENT NO. : 4,986,187

DATED : January 22, 1991

INVENTOR(S) : Roger Booth, Thomas D. Heidt

It is certified that error appears in the above-identified patent and that said Letters Patent is hereby corrected as shown below:

Column 15, line 68, after "such" insert --as--.

Signed and Sealed this

Twentieth Day of July, 1993

Attest:

MICHAEL K. KIRK

*Attesting Officer*  *Acting Commissioner of Patents and Trademarks*